US005582700A

United States Patent [19]
Bryning et al.

[11] Patent Number: 5,582,700
[45] Date of Patent: Dec. 10, 1996

[54] ELECTROPHORETIC DISPLAY UTILIZING PHASE SEPARATION OF LIQUIDS

[75] Inventors: Zbigniew Bryning, Campbell; Remy Cromer, San Jose, both of Calif.

[73] Assignee: Zikon Corporation, Calif.

[21] Appl. No.: 543,707

[22] Filed: Oct. 16, 1995

[51] Int. Cl.⁶ .......................... G01N 27/26; G01N 27/447
[52] U.S. Cl. .......................... 204/450; 204/600; 345/105; 345/107
[58] Field of Search .................................. 204/450, 600; 345/107, 105

[56] References Cited

U.S. PATENT DOCUMENTS

| | | | |
|---|---|---|---|
| 3,612,758 | 10/1971 | Evans et al. | 348/803 |
| 3,668,106 | 6/1972 | Ota | 358/305 |
| 3,756,693 | 9/1973 | Ota | 345/107 |
| 4,218,302 | 8/1980 | Dalisa et al. | 359/296 |
| 4,272,596 | 6/1981 | Harbour et al. | 430/37 |
| 4,419,663 | 12/1983 | Kohashi | 345/107 |
| 5,181,016 | 1/1993 | Lee | 345/84 |

*Primary Examiner*—John Niebling
*Assistant Examiner*—John S. Starsiak, Jr.
*Attorney, Agent, or Firm*—Haynes & Davis

[57] ABSTRACT

An electrophoretic display is provided which includes first and second plates spaced apart to define a volume of space therebetween. The display also includes a first electrode positioned on the first plate, a second electrode positioned on the second plate, and an emulsion positioned within the space. The emulsion includes a non-polar phase forming a continuous phase of the emulsion and a polar phase forming a non-continuous phase of the emulsion.

The polar phase of the emulsion is capable of forming droplets (reverse micelles or reverse emulsions) in the non-polar phase. The polar phase includes a dye which is insoluble in the non-polar phase, a polar solvent, and a detergent. Images are provided by the display by controlling the distribution of the polar phase droplets containing the dye in the non-polar liquid phase using an electric field formed between the first and second electrodes.

A method is also provided for forming an image by electrophoretic phase separation of an emulsion. According to the method, an emulsion is formed between the non-polar phase which constitutes a continuous phase of the emulsion and the polar phase which constitutes a non-continuous phase of the emulsion. The polar phase forms droplets in the non-polar phase, the polar phase including a dye, a polar solvent, and a detergent. An image is formed in the display by applying an electric field across the emulsion which causes the polar phase droplets to redistribute themselves relative to the non-polar phase, redistribution including the coagulation of the polar phase in the non-polar phase as well as the separation of the polar phase from the non-polar phase.

32 Claims, 17 Drawing Sheets

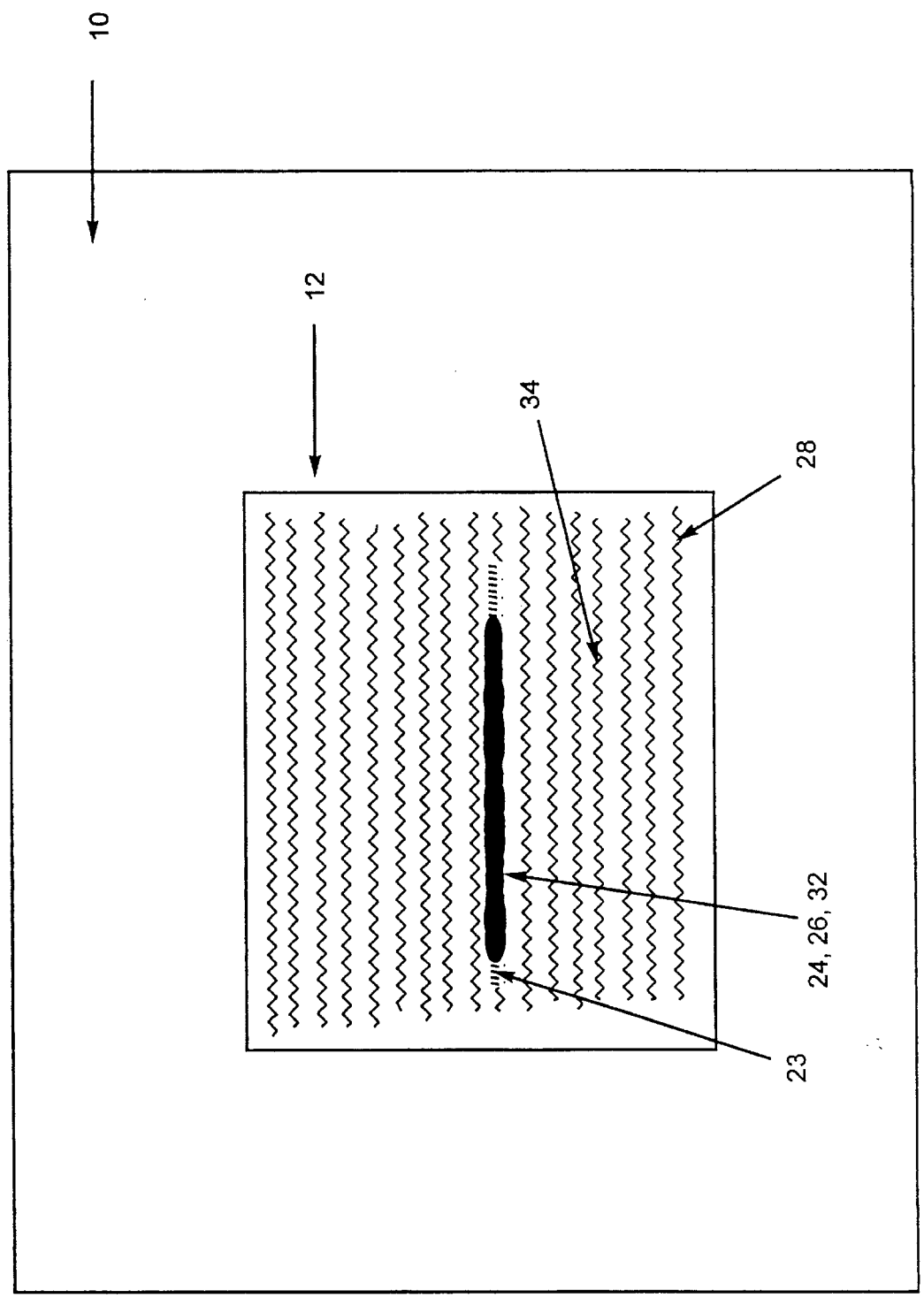

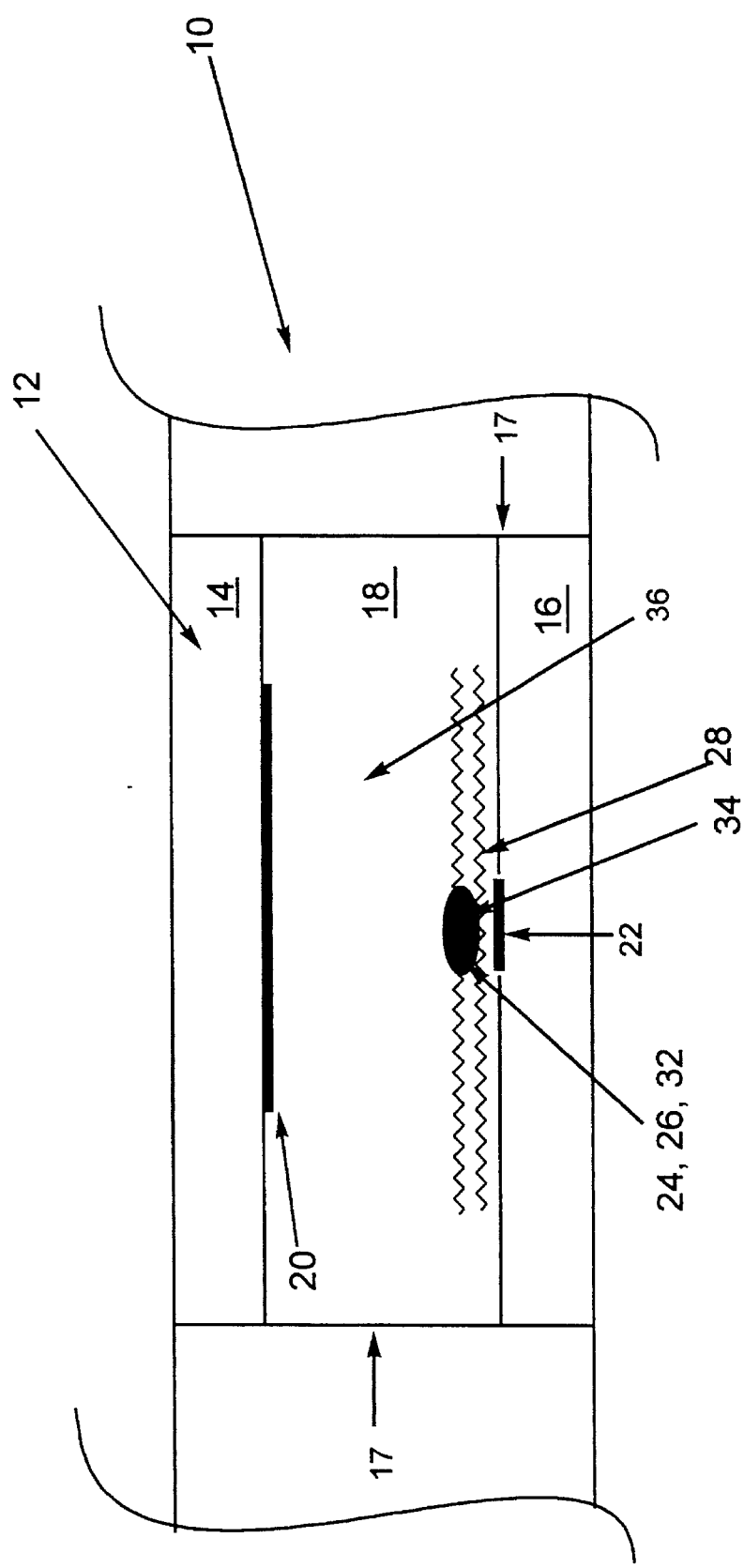

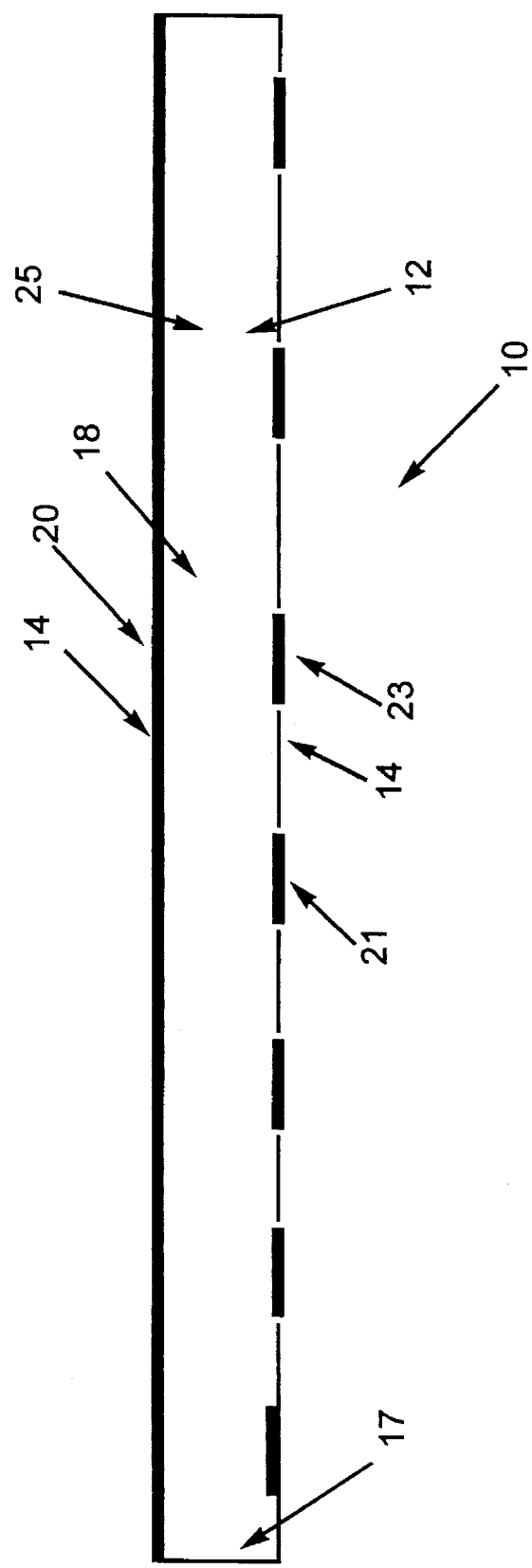

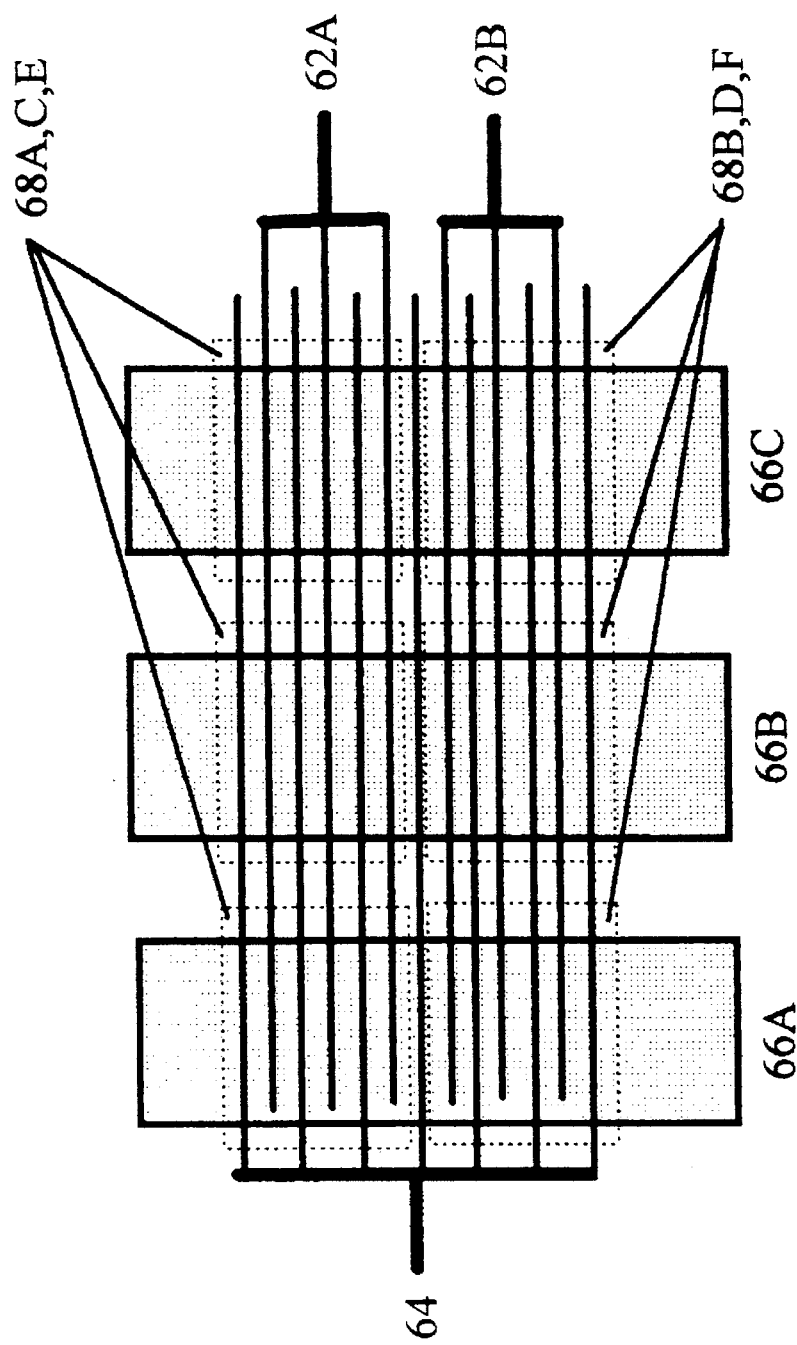

ELECTROPHORETIC DISPLAY UTILIZING PHASE SEPARATION OF LIQUIDS

BACKGROUND OF THE INVENTION

1. Field of the Invention

This invention relates to an electrophoretic display device. More specifically, the invention relates to an electrophoretic display device which forms an image through the electrophoretic controlled phase separation of a polar phase and a non-polar phase forming an emulsion.

2. Description of Related Art

Cathode ray tube (CRT) displays are frequently used in computer applications because of their speed and ease of scanning. Cathode ray tubes, however, are bulky and thus are not ideal for use in portable devices such as portable computers. CRT displays also have relatively high energy requirements which make these displays impractical for use in portable devices such as portable computers, personal portable information systems, modems, pagers, mobile phones, television monitors and other hand held devices. A further problem associated with using CRT displays is the difficulty associated with designing a CRT having a flat display panel.

Liquid crystal displays (LCD) have the advantages over CRT displays of providing a flat display panel which can produce images using relatively little energy. Liquid crystal displays, however, have the disadvantage that they generally provide a narrow field of view, enabling the user to view the display over a relatively narrow range. Liquid Crystal displays providing a wider field of view have been designed. However, these displays generally require polarizers which make the displays more expensive and complicated to manufacture. LCDs like Guest-Host, Nematic-Cholesteric Phase Change and light scattering by micron-size droplets do not require polarizers. However, these displays are slow and sensitive to temperature changes.

Electrophoretic image displays have been developed as an alternative to CRT and LCD displays, particularly for portable display applications. In general, electrophoretic image displays provide the advantages of requiring significantly less power than CRT displays and can be viewed over a wider field of view than LCD displays.

In the past, electrophoretic image displays have relied on the separation of charged particles dispersed in a dispersion medium where the particles are moved into and out of a dispersion using an electric field. The particles serve to either contribute a color or the absence of a color to the display.

Pixels are defined in an electrophoretic display as a region of the display in which the movement of particles, or other material forming a color (or absence of a color) of the display, is independently controlled relative to other regions of the display. Pixels are most commonly formed by a series of pairs of electrodes, each pair of electrodes forming a separate pixel. When a voltage potential is applied across a specific pair of electrodes, the electric potential draws the charged particles to a particular electrode. When no voltage is applied, the charged particles remain dispersed in the dispersion fluid, the color of the pixel being controlled by whether the charged particles are dispersed.

The charged particles used in electrophoretic image displays have a tendency to aggregate and/or adhere to the electrodes, reducing the useful life of the display as well as reducing the contrast ratio that can be achieved. The formation of stable dispersions using particles can also be difficult. For example, it can be difficult to match the specific densities of the liquid and the particles to form a stable dispersion. In addition, the image response rate achieved by electrophoretic displays using charged particles is limited by the rate at which the particles can be drawn into and out of the dispersion fluid.

The achievement of multi-colored electrophoretic displays using particles is limited since the particles do not generally allow light to pass through the particles. As a result, it is generally not practical to superimpose a series of cells in which particles are used as pigments.

A need currently exists for an electrophoretic image display system in which the image is formed without the use of particles. A need also exists for an electrophoretic image display which employs pigments which do not aggregate or adhere to the electrodes. A need also exists for a display in which the pigments are rapidly and stably dispersed in a dispersion medium. A further need exists for a display which employs a pigment—dispersion system having an improved response rate over electrophoretic displays using particles. Yet a further need exists for a multicolor electrophoretic display in which the pigments do not scatter light so that multiple pixels of different colors can be superimposed.

SUMMARY OF THE INVENTION

An electrophoretic display is provided which includes first and second plates spaced apart to define a volume of space therebetween. The display also includes a first electrode positioned on the first plate, a second electrode positioned on the second plate, and an emulsion positioned within the space. The emulsion includes a non-polar phase forming a continuous phase of the emulsion and a polar phase forming a non-continuous phase of the emulsion.

The polar phase of the emulsion is capable of forming droplets, i.e., reverse micelles or reverse emulsions, in the non-polar phase and can be transported within the non-polar phase using an electric field. Images are provided by the display by controlling the distribution of the polar phase droplets containing the dye in the non-polar liquid phase using an electric field formed between the first and second electrodes. By controlling the distribution of the polar phase droplets using the electric field, the polar phase can be separated from the non-polar phase, coagulated in the non-polar phase, or dispersed in the non-polar phase.

The non-polar phase is formed of one or more non-polar compounds which form a liquid. It is preferred that the one or more non-polar compounds form a liquid at about 25° C. However, it should be understood that the emulsion and display of the present invention may be designed for use at significantly higher and lower temperatures, depending on the application.

In general, most non-polar compounds can be used in the non-polar phase. The non-polar phase preferably includes $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{3-30}$ esters, $C_{3-30}$ thioesters, $C_{3-30}$ thioethers, terpenes, $C_{2-30}$ organosilanes, and/or $C_{2-30}$ organosiloxanes, each of which may be cyclic or acyclic and may be optionally substituted with halides or other non-polar substituents. The non-polar phase may also include aromatic compounds, such as benzenes, toluenes and xylenes, optionally substituted with halides or other non-polar substituents as described above. The non-polar phase may also include one or more of the above described non-polar compounds substituted with an alcohol, amine, amide and/or phosphate functional groups where the overall character of the compound remains non-polar. The non-polar phase may have a colored or a colorless appearance.

The polar phase is characterized by being able to form reverse emulsions or reverse micelles, hereinafter referred to as droplets, in the non-polar phase and can be transported within the non-polar phase using an electric field.

The polar phase includes a dye that is soluble in the polar phase and substantially insoluble in the non-polar phase. The dye may be neutral or charged. When charged, the dye may be positively charged, negatively charged or may be zwitterionic. Examples of suitable dyes include cationic or anionic monazo dyes, cationic or anionic diazo dyes, triphenylmethane dyes, pyrazolone dyes, acridines, charged porphyrines, oxazines, diformazans, colored metal and transition metal complexes, metal salts, acid anthraquinone dyes, amphoteric anthraquinone dyes, cationic diphenylmethane dyes, charged polymethine dyes, thiazines, charged phthalocyanines, formazans, and tetrazolium dyes.

The polar solvent serves to help solubilize the dye in the polar phase as well as to assist in the formation of droplets in the non-polar phase. In some instances, little or no polar solvent is needed to form the polar phase. Examples of polar solvents which may be used include, but are not limited to alcohols, amines, amides, ketones, carboxylic acids and their salts, glycols, polyethers, sulfides, sulfonic acids, sulfenic acids and their salts, sulfates, phosphides, phosphites, phosphonites, phosphinites, phosphates, phosphonates, phosphinates, imides, nitriles, isonitriles, amidines, nitro and nitroso compounds, sulfoxides, sulfonates, thiols, and water, as well as mixtures thereof. More specific examples of suitable polar solvents include DMSO, DMF, dimethylacetamide, dimethyl sulfone, sulfolane, hexamethylphosphoric triamide, higher amides, methanol, ethanol, glycols, nitromethane, acetonitrile, water, methoxyethanol, methyl Cellosolve and monoethyl ethers. Mixtures of two or more polar compounds, such as the ones described above, may also be used as the polar solvent in the electrophoretic display of the present invention.

The detergent used in the polar phase of the emulsion serves to solubilize the dye in the polar phase by incorporating the dye in the interior of droplets formed by the detergent. In this regard, the detergent serves to stabilize the emulsion formed between the polar phase and the non-polar phase. When charged detergents are used, the detergent also serves to provide an electric charge to the polar phase droplets. In some instances, no detergent is needed.

The detergent also serves to control the surface properties of the polar phase. For example, the detergent influences the wetability of the polar phase in the display. The detergent also influences the size and shape of the droplets formed by polar phase.

Examples of suitable detergents include, but are not limited to neutral detergents such as betaines like Zwittergent, phospholipids, lecithins, polyoxyethylenes like TRITON™ and TWEEN™ detergents, amphiphilic bloc polymers of alkene oxides, such as ethylene oxide and propylene oxide, cationic surfactants such as alkyldimethylamine oxides, quaternary ammonium based detergents like CTAB or having the general formula $R_xH_yN^+X^-$ (R=organic substituent (alkyl, aryl, ether, etc. ), x=1–4, y=0–3, and X=counter ion) and anionic surfactants such as alkyl and aryl sulfonates, alkyl and aryl sulfates such as sodium dodecyl sulfate (SDS), and bis(2-ethylhexyl)sodium sulfosuccinate, carboxylated detergents, phosphate based detergents. The detergent may also be fluorocarbon based detergents, bolaamphiphiles, and solids such as $SiO_2$, $Al_2O_3$, $BaTiO_4$, and Zeolites having particle sizes between about a few angstroms and a few microns, the above particles serving to stabilize a second gel-like phase. Optionally, the dye may be covalently attached to the detergent.

The electrophoretic display may include a series of first and second electrodes, the series of first and second electrodes defining a series of pixels. In such instances, the display preferably further includes a multiplexer attached to the series of first and second electrodes for selectively delivering voltages to the different electrodes and a controller connected to the multiplexer to deliver control signals controlling the delivery of voltage to the different electrodes in the series of electrodes.

The electrophoretic display preferably also includes a control electrode which provides the display with memory by maintaining the distribution the relative distribution of the polar phase in the non-polar phase, thereby maintaining the appearance of the display adjacent the control electrode.

A method is also provided for forming an image by electrophoretic phase separation of an emulsion. According to the method, an emulsion is formed between a non-polar phase which constitutes a continuous phase of the emulsion and a polar phase which constitutes a non-continuous phase of the emulsion. The polar phase forms droplets (reverse micelles or reverse emulsions) in the non-polar phase, the polar phase including a dye, and a polar solvent and/or a detergent. The polar phase may optionally not include a polar solvent or a detergent.

The dye is substantially insoluble in the non-polar phase. The emulsion has the combined color appearance of the non-polar phase and polar phase which includes the dye when the polar phase is dispersed in the non-polar phase. An image is formed in the display by applying an electric field across the emulsion which causes the polar phase including the dye to redistribute itself relative to the non-polar phase, the redistribution causing the emulsion to take on the color appearance of the non-polar phase. Redistribution of the polar phase in the non-polar phase can include the coagulation of the polar phase droplets within the non-polar phase or the separation of the polar phase from the non-polar phase. For example, the polar phase may aggregate to form a gel.

According to the method, the electric field used to redistribute the polar phase in the non-polar phase may be an alternating electric field having a frequency between about 1 Hz and 1000 Hz or may be a constant electric field. The method may also further include the step of redispersing the polar phase including the dye in the non-polar phase by applying an alternating electric field having a frequency between about 100 Hz and 100 kHz. Depending on the compositions of the polar and non-polar phases, the electric fields used to redistribute and redisperse the polar phase relative to the non-polar phase may be reversed.

Other aspects and advantages of the present invention can be seen upon review of the figures, the detailed description, and the claims which follow.

BRIEF DESCRIPTION OF THE FIGURES

FIG. 1A illustrates the use of an electric field in a display to disperse a polar phase within a non-polar phase such that the distribution of the polar phase in the non-polar phase macroscopically appears to be continuous.

FIG. 1B provides a front-on view of the display illustrated in FIG. 1A.

FIG. 1C illustrates the use of an electric field in the display to cause the polar phase to coagulate such that gaps appear between regions of polar phase.

FIG. 1D provides a front-on view of the display illustrated in FIG. 1C.

FIG. 1F provides a front-on view of the display illustrated in FIG. 1E.

FIGS. 2A–B illustrate the electrophoretic image display illustrated in FIG. 1A in which a volume of gas is included in the space housing the emulsion.

FIG. 2A illustrates the use of an electric field to cause the polar phase to be distributed adjacent one of the electrodes.

FIG. 2B illustrates the use of an electric field to cause the polar phase to be distributed within the non-polar phase.

FIG. 3A illustrates a segmented display where the electrodes are adjacent the opposing plates.

FIG. 3B illustrates a segmented display where the electrodes are adjacent the perimeter walls.

FIG. 4 illustrates a non-segmented display.

FIG. 9 illustrates an electrode design for use in the display including a divided electrode and a control electrode.

FIG. 10A illustrates the display in the absence of an electric field.

FIG. 10B illustrates the display under write conditions using a constant electric field.

FIG. 10C illustrates the display under write conditions using an alternating electric field.

FIG. 10D illustrates the display under erase conditions using a constant electric field.

FIG. 10E illustrates the display under erase conditions using an alternating electric field.

FIG. 11A illustrates electric conditions for writing the pixels.

FIG. 11B illustrates electric conditions for holding the pixels.

FIG. 11C illustrates electric conditions for selectively erasing a pixel.

FIG. 11D illustrates electric conditions for selectively holding a pixel.

DETAILED DESCRIPTION

Figure 1A:
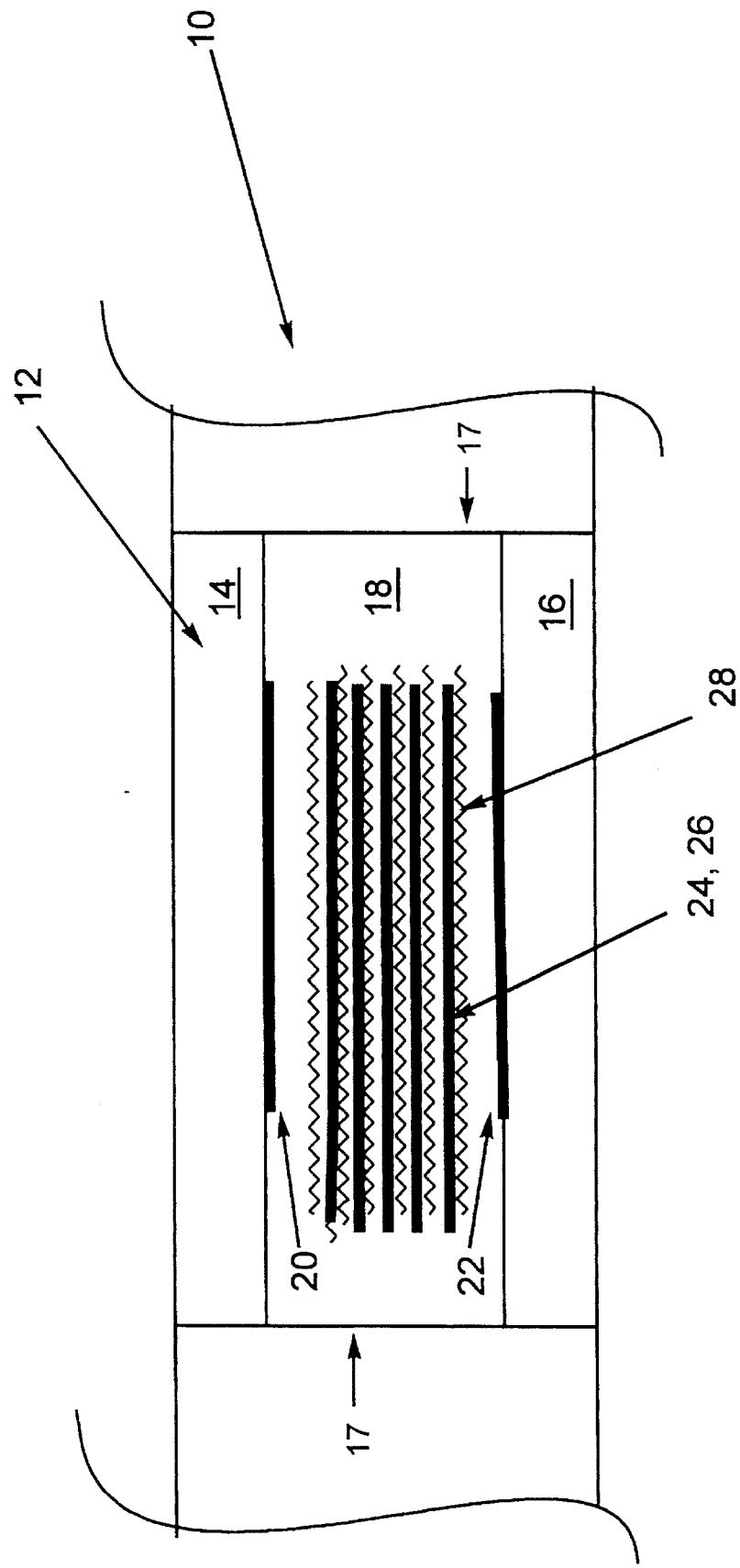
FIGS. 1A–D illustrate an electrophoretic image display.

The invention relates to an electrophoretic image display which forms an image through the modulation of an electric field to control the relative phase separation of a non-polar continuous phase and a polar non-continuous phase of an emulsion. As used herein, the term "emulsion" refers to a heterogeneous system consisting of a continuous phase and a non-continuous phase capable of forming droplets (i.e., reverse micelles or reverse emulsions) in the continuous phase.

According to the present invention, a non-polar phase forms the continuous phase of an emulsion. A polar phase is dispersed as droplets in the non-polar phase as the non-continuous phase of the emulsion. Included in the polar phase is a dye which is insoluble in the non-polar phase. Optionally included in the polar phase is a polar solvent and/or a detergent. It should be noted that when a polar solvent or detergent is used in the polar phase, some amount of the polar solvent or detergent may be solubilized in the non-polar phase.

The polar solvent may be colorless or may have a colored appearance independent of the dye. The dye may also serve as both the dye and the polar solvent when a separate polar solvent is not needed to form the polar phase. The non-polar phase may be colorless or may have a colored appearance. The color of the non-polar phase should be selected such that a contrast is created between the color of the non-polar phase and the combined color of the polar phase of the emulsion.

An electric field is used to provide energy to transport the polar phase relative to the non-polar phase. By controlling the distribution of the polar phase in the emulsion using the electric field, e.g., the relative coagulation of polar phase droplets within the non-polar phase of the emulsion or the separation of the polar phase from the non-polar phase, the distribution of the dye within the electrophoretic display is controlled, thereby controlling the overall appearance of the emulsion upon which the appearance of the display is based. When a charged dye, a charged polar solvent and/or a charged detergent is used, the electric field may also be employed to cause the polar phase containing the dye to move adjacent an oppositely charged electrode.

The distribution of the polar phase within the non-polar phase of the emulsion is controlled by controlling the frequency, amplitude and/or polarity of the electric potential applied across the electrophoretic display. In general, the distribution of the polar phase within the non-polar phase is dependent on the separation between the electrodes used in the display, the amplitude of the voltage, the voltage offset and the voltage frequency, these variables also being dependent on the particular properties of the non-polar and polar phases used. Each of the above-described variables influencing the distribution of the polar phase in the emulsion is described in further detail herein.

An example of an electrophoretic image display according to the present invention is illustrated in FIGS. 1A–F. As illustrated in FIGS. 1A–F, the display 10 includes an electrophoretic cell 12 formed of first and second plates 14, 16, the first and second plates 14, 16 being spaced apart to define a volume of space 18 within the cell 12. The cell also includes perimeter walls 17 which combine with the plates to define space 18. The first and second electrodes 20, 22 are positioned on the first and second plates 14, 16 respectively.

It is noted that FIGS. 1A–F are illustrated where the electrodes are positioned adjacent the first and second plates 14, 16. It should be noted, however, that the display may be designed so that the electrodes are positioned adjacent the perimeter walls 17, for example, as illustrated in FIG. 3B.

Included within the space 18 is a non-polar phase 28 forming the continuous phase of an emulsion. Also included in the space 18 is a polar phase 24 including a dye 26 solubilized therein, the polar phase forming the non-continuous phase of the emulsion. According to this embodiment, the space 18 is substantially filled with the phases forming the emulsion.

Figure 1B:
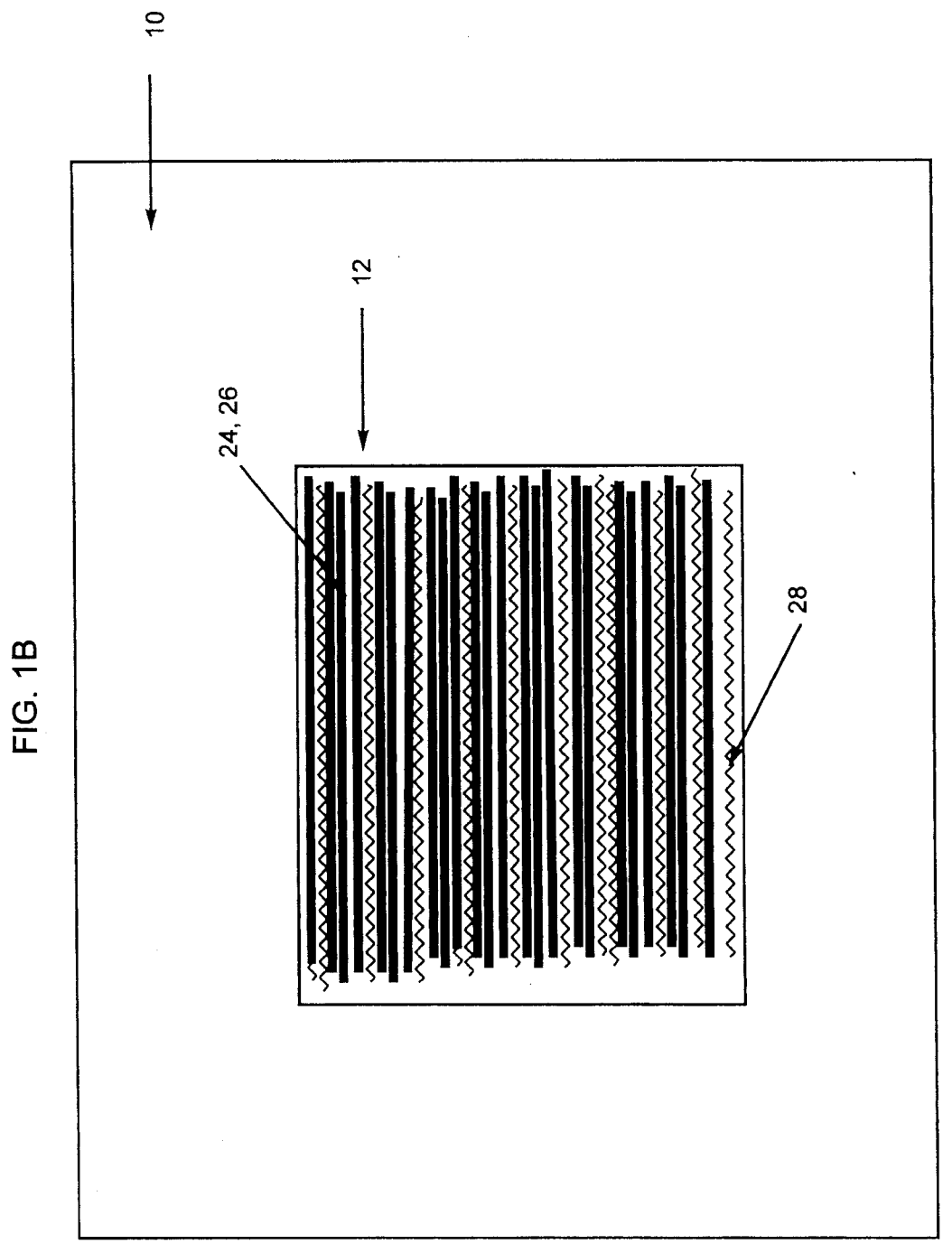

As illustrated in FIG. 1A, the polar phase 24 solubilizing the dye 26 forms an emulsion in the non-polar phase 28 such that the distribution of the polar phase 24 in the non-polar phase 28 appears to be continuous. FIG. 1B provides a front-on view of the display illustrated in FIG. 1A showing the distribution of the polar phase 24 in the non-polar phase 28 as appearing to be continuous. When the distribution of the dye 26 dissolved in the polar phase 24 is relatively evenly distributed within the non-polar phase 28, as is illustrated in FIGS. 1A–B, the display 10 adopts the combined color characteristics of the dye 26, the polar phase 24, and the non-polar phase 28.

The emulsion illustrated in FIGS. 1A and 1B may form spontaneously, i.e. without the assistance of an electric field. The process of forming an emulsion spontaneously is relatively slow (about 0.1 sec.–10 sec.). Formation of the emulsion can be accelerated with the assistance of an electric field which drives the redispersion of the polar phase in the non-polar phase, for example, an alternating electric field having a frequency between about 100 Hz and 100 kHz.

Figure 1C:
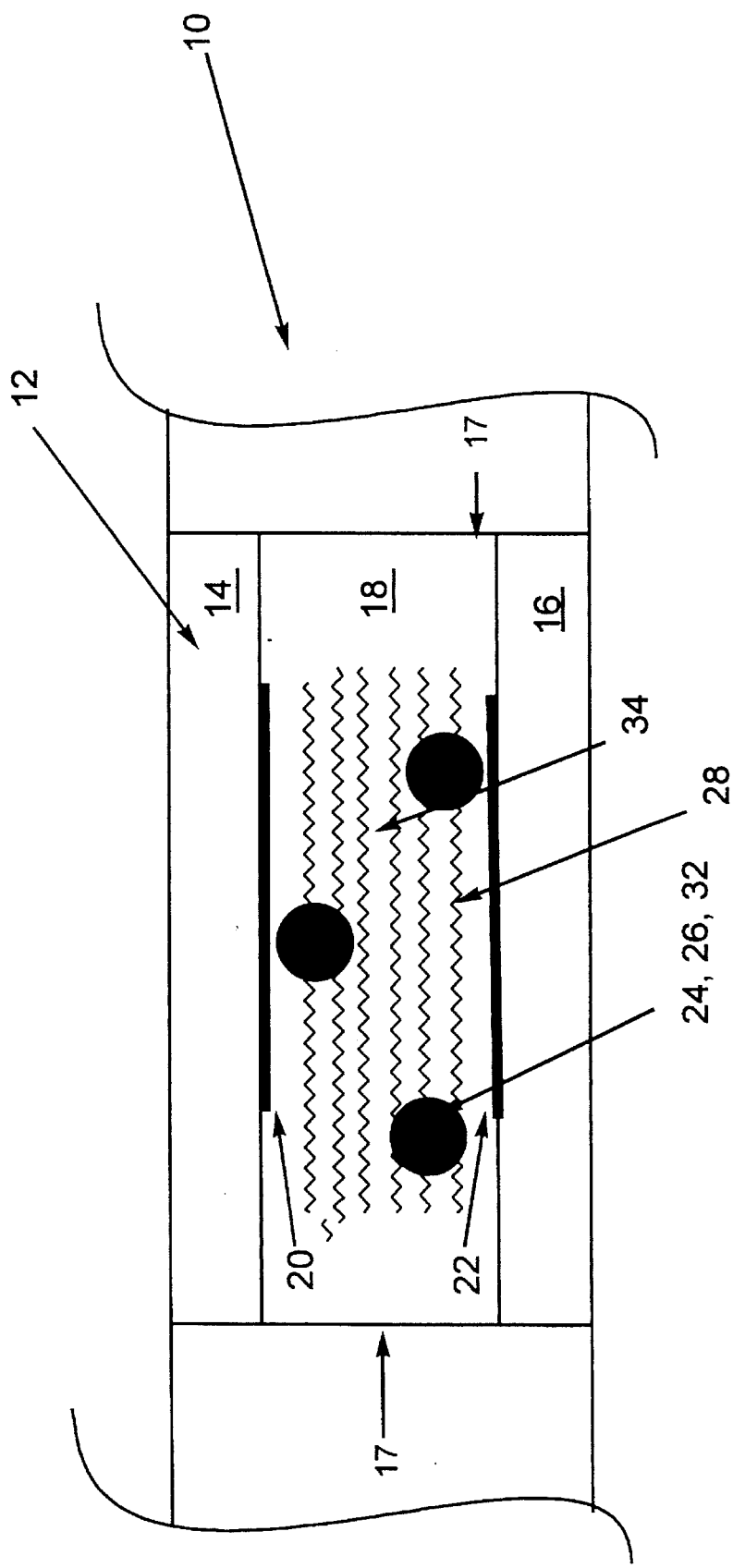
Figure 1D:
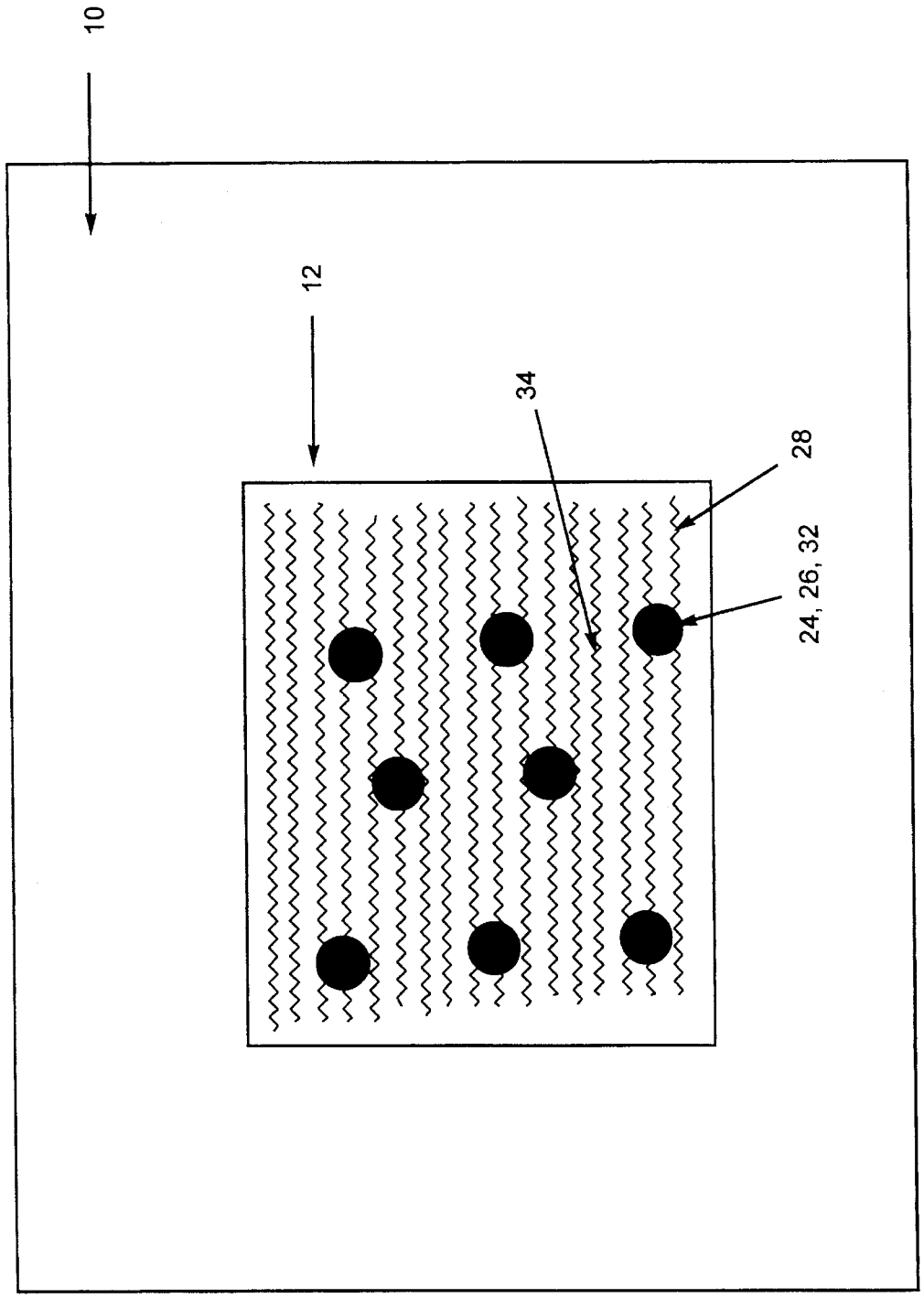

As illustrated in FIG. 1C, an electric field may also be formed between the first and second electrodes 20, 22 such that the polar phase 24 forms larger sized droplets 32 within the non-polar phase such that visible gaps 34 appear between the larger sized droplets 32 of polar phase 24. FIG. 1D provides a front-on view of the display illustrated in FIG. 1C showing the distribution of the polar phase 24 in the non-polar phase 28. As illustrated in FIG. 1D, the gaps 34 between the larger sized droplets 32 of the polar phase 24 cause the display 10 to macroscopically take on the color of the non-polar phase 28. Thus, as illustrated in FIGS. 1C–D, the color of the display can be controlled by controlling the relative coagulation of the polar phase droplets in the emulsion.

Figure 1E:
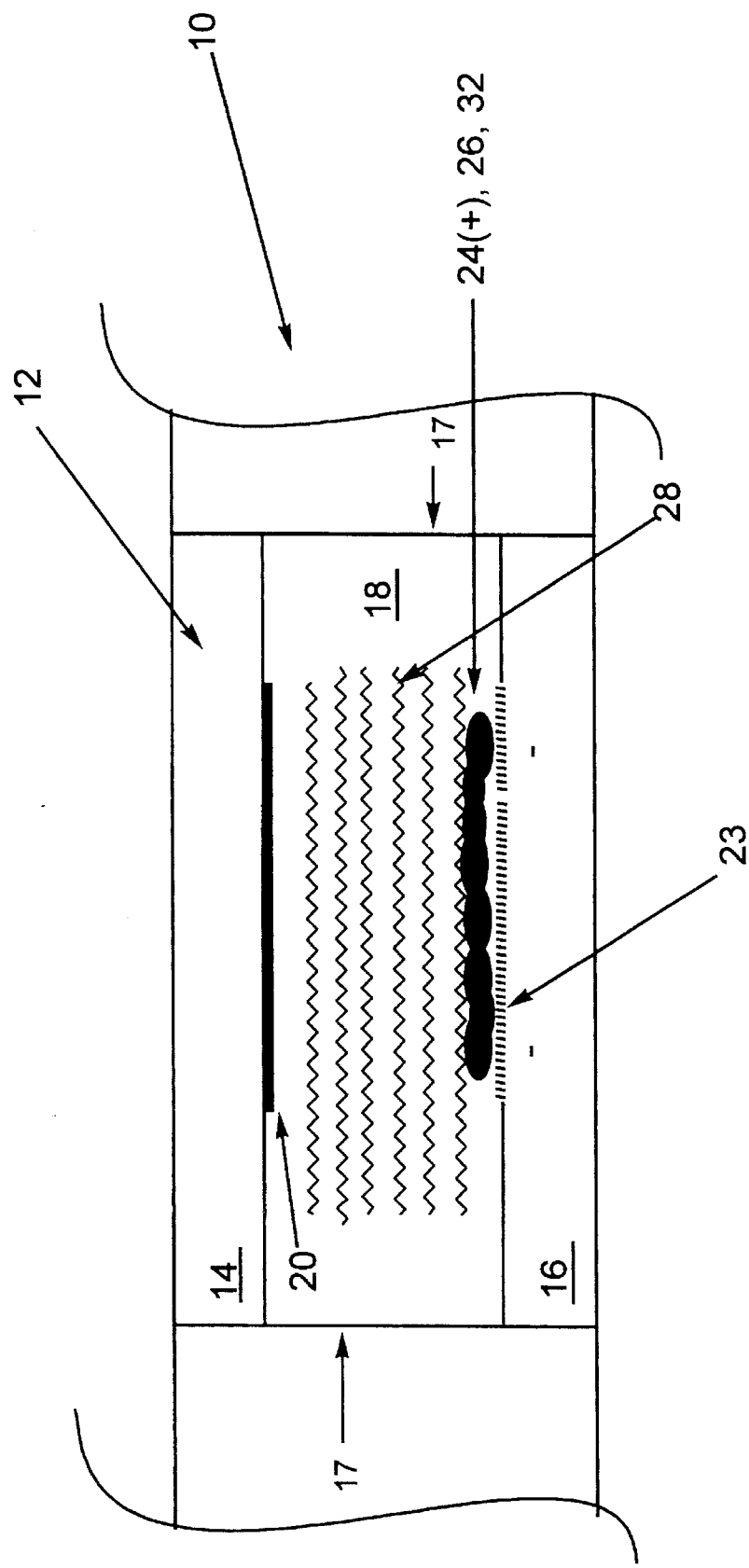
FIG. 1E illustrates the application of an electric field which causes the polar phase to accumulate at an electrode.

As illustrated in FIG. 1E, an electric field may also be applied which causes the polar phase and dye to accumulate at an electrode having a charge that is opposite to the combined charge of the dye, the detergent and the polar solvent used in the polar phase of the emulsion. For example, an electric field can be applied which causes positively charged droplets (+) to accumulate at the negatively charged cathode 23. FIG. 1F is a front-on view of the display illustrated in 1E. As illustrated in FIG. 1F, the display macroscopically appears to be the color of the non-polar phase.

Figure 2B:
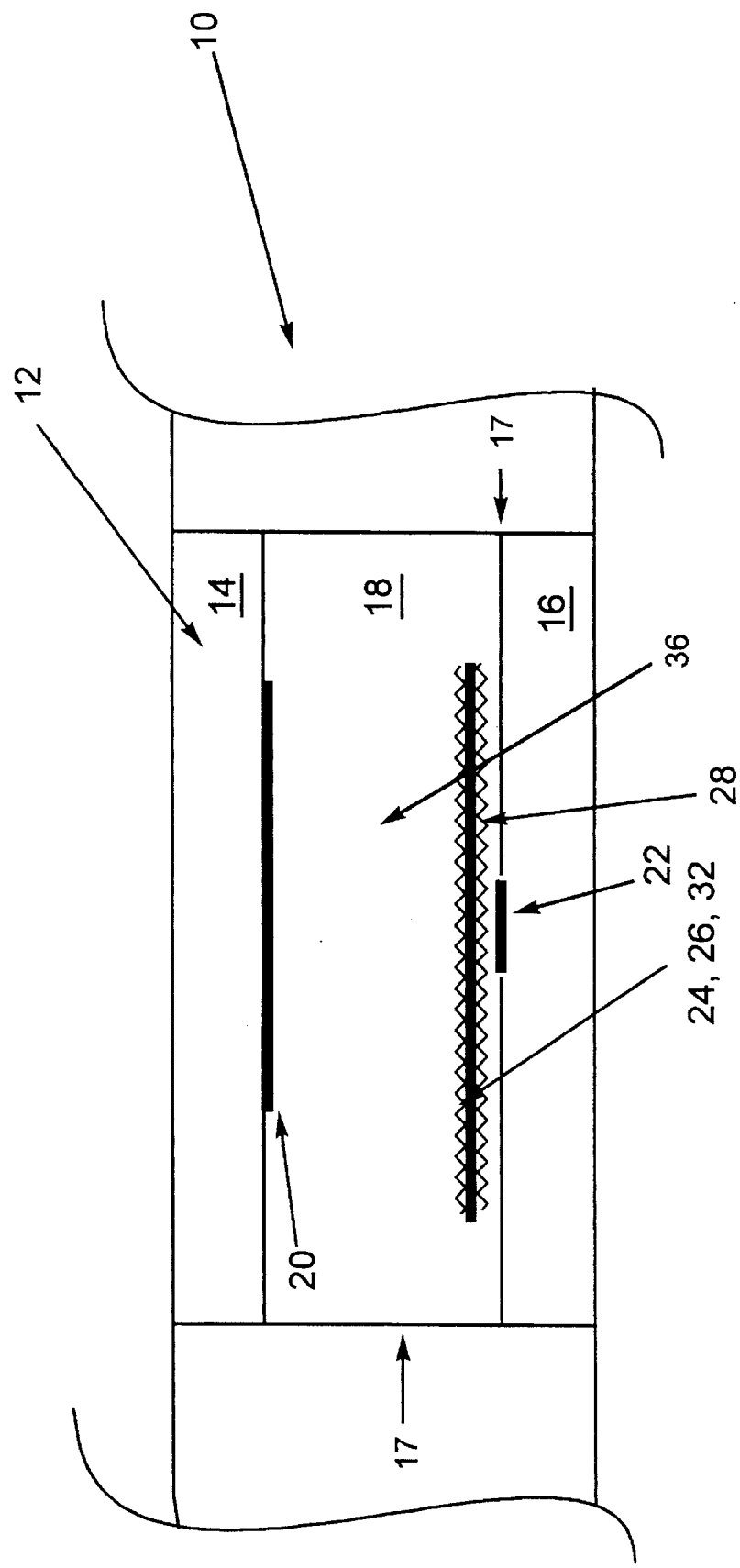

An alternate embodiment of the electrophoretic display of the present invention is illustrated in FIGS. 2A–B. The electrophoretic display illustrated in FIGS. 2A–B is the same as the display illustrated with regard to FIGS. 1A and 1C except that a volume of gas 36 is included within the space 18 housing the emulsion. According to this embodiment of the display, the emulsion forms a film along one of the first and second plates 14, 16, illustrated in FIGS. 2A–B as being the second plate 16. The thickness of the gas, i.e., the distance between the film and the opposing plate, may be about 1 to 100 microns.

According to this embodiment, the emulsion film is preferably about 1 micron or less in thickness. At such smaller thicknesses, surface tension prevents the film from splattering. In addition, both plates 14, 16 can be coated to increase or decrease the wetability of the plates to promote adhesion of the film to a particular plate. The surface of the plates can also be modified (e.g., made rough) to increase capillary force of the film to the plate.

As illustrated in FIG. 2A, an electric field may be formed between the first and second electrodes 20, 22 such that the polar phase 24 solubilizing the dye 26 coagulates adjacent the first electrode. As illustrated in FIG. 2B, an electric field may also be formed between the first and second electrodes 20, 22 such that the polar phase 24 solubilizing the dye 26 appears to form a thin continuous film across the plate 16.

The non-polar phase 28 employed as the continuous phase of the emulsion illustrated in FIGS. 1–2 may be formed of any non-conductive, non-polar liquid which does not solubilize the dye used in the polar phase. It is noted that the polar solvent and the surfactant may be miscible with the non-polar phase without interfering with the functioning of the electrophoretic display of the present invention.

Examples of suitable non-polar phase liquids include, but are not limited to $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{3-30}$ esters, $C_{3-30}$ thioesters, $C_{3-30}$ thioethers, terpenes, $C_{2-30}$ organosilanes, and/or $C_{2-30}$ organosiloxanes, each of which may be cyclic or acyclic and may be optionally substituted with halides or other non-polar substituents. The non-polar phase may also include aromatic compounds, such as benzenes, toluenes and xylenes, optionally substituted with halides or other non-polar substitutents as described above. The non-polar phase may also include one or more of the above described non-polar compounds substituted with an alcohol, amine, amide and/or phosphate functional groups where the overall character of the compound remains non-polar. The non-polar phase may have a colored or a colorless appearance. In general, a wide range of non-polar compounds can be used in the "non-polar phase". Mixtures of two or more non-polar compounds, such as the ones described above, may also be used to form the non-polar phase in the electrophoretic display of the present invention.

The polar phase 24 employed as the non-continuous phase of the emulsion includes a dye 26 an may further include a polar solvent and/or a detergent. Combined, the polar phase 24 forms droplets (reverse micelles or reverse emulsions) in the non-polar phase. It is noted that the polar phase may be formed without the use of both a polar solvent and a detergent.

The dye 26 used in the display may be any compound having a colored appearance in solution and which is soluble in the polar phase 24 and insoluble in the non-polar phase 28 such that the dye 26 remains in the polar phase of the emulsion. The dye 26 may be an organic molecule or an inorganic molecule. The dye may be positively charged, negatively charged, zwiterionic or uncharged. The dye may also be used as both the dye and the polar solvent in instances where a polar solvent is not needed to assist in the formation of droplets. Mixtures of two or more different dyes, such as the ones described above, may also be used in the electrophoretic display of the present invention.

Examples of suitable dyes include, but are not limited to monazo dyes, diazo dyes, triphenylmethane dyes, pyrazolone dyes, acridines, porphyrines, diformazan dyes, squarain dyes, oxazines, colored metal and transition metal complexes, metal salts, acid anthraquinone dyes, amphoteric anthraquinone dyes, diphenylmethane dyes, polymethine dyes, thiazines, phthalocyanines, formazans, and tetrazolium dyes.

The polar solvent serves to help solubilize the dye in the polar phase as well as to assist in the formation of droplets (reverse micelles or reverse emulsions) in the non-polar phase. In some instances, little or no polar solvent is needed to form the polar phase. Examples of polar solvents which may be used include, but are not limited to alcohols, amines, amides, ketones, carboxylic acids and their salts, glycols, polyethers, sulfides, sulfonic acids, sulfenic acids and their salts, sulfates, phosphides, phosphites, phosphonites, phosphinites, phosphates, phosphonates, phosphinates, imides, nitriles, isonitriles, amidines, nitro and nitroso compounds, sulfoxides, sulfonates, thiols, and water, as well as mixtures thereof. More specific examples of suitable polar liquids include DMSO, DMF, dimethylacetamide, dimethyl sulfone, sulfolane, hexamethylphosphoric triamide, higher amides, methanol, ethanol, glycols, nitromethane, acetonitrile, water, methoxyethanol, methyl Cellosolve and monoethyl ethers. Mixtures of two or more polar compounds, such as the ones described above, may also be used as the polar solvent in the electrophoretic display of the present invention.

The detergent included in the polar phase of the emulsion serves to solubilize the dye in the polar phase by incorporating the dye in the interior of the reverse micelles or reverse emulsions formed by the detergent. In this regard, the detergent serves to stabilize the emulsion formed between the polar phase and the non-polar phase. When charged detergents are used, the detergent also serves to provide an electric charge to the polar phase.

The detergent also serves to control the surface properties of the polar phase. For example, the detergent influences the wetability of the polar phase in the display. The detergent also influences the size and shape of the droplets formed by polar phase.

Examples of suitable detergents include, but are not limited to neutral detergents such as betaines like Zwittergent, phospholipids, lecithins, polyoxyethylenes like TRITON™ and TWEEN™ detergents, amphiphilic bloc polymers of alkene oxides, such as ethylene oxide and propylene oxide, cationic surfactants such as alkyldimethylamine oxides, quarternary ammonium based detergents like CTAB or having the general formula $R_xH_yN^+X^-$ (R=organic substituent (alkyl, aryl, ether, etc.), x=1–4, y=0–3, and X=counter ion) and anionic surfactants such as alkyl and aryl sulfonates, alkyl and aryl sulfates such as sodium dodecyl sulfate (SDS), and bis(2-ethylhexyl)sodium sulfosuccinate, carboxylated detergents, phosphate based detergents. The detergent may also be fluorocarbon based detergents, bolaamphiphiles, and solids such as $SiO_2$, $Al_2O_3$, $BaTiO_4$, and Zeolites having particle sizes between about a few angstroms and a few microns, the above particles serving to stabilize a second gel-like phase. The detergent may also be a mixture of the above described detergents.

In one embodiment, the dye may be covalently bound to the detergent to form a dye-detergent conjugate. Examples of dye-detergent conjugate include, but are not limited to dyes coupled to synthetic or natural polymers such as polypeptides, dyes coupled to non-charged polymers, for example poly(alkylene) oxides such as polyethylene glycols, and amphiphilic bloc polymers of alkylene oxides, such as ethylene oxide and propylene oxide.

The preferred concentration of the dye to be used in the polar phase depends on the contrast ratio desired and is preferably near saturation. The dye concentration should be sufficiently below saturation to prevent dye crystallization at lower temperatures. By using a higher dye concentration, greater contrast can be achieved per unit thickness of the electrophoretic cell. By using thinner electrophoretic cells, the display may be operated at lower voltages and at higher response rates.

The ratio of the polar phase to the non-polar phase is preferably between about 1:1 and 1:100 volume:volume, more preferably about 1:10. By optimizing the ratio of the polar phase to the non-polar phase, high contrast ratios can be achieved. With regard to segmented displays, the contrast ratio is also dependent on electrode spacing.

Electrolysis of components in the polar phase increases at higher concentrations of the polar phase. It is therefore desirable to insulate the emulsion from the electrodes when higher concentrations of the polar phase are used, particularly when the materials used to form the polar phase are susceptible of undergoing some form of electrochemical reaction.

With regard to the design of the electrophoretic image display, the basic unit of the display is an electrophoretic cell 12 as illustrated in FIG. 1A. The cell is defined by first and second plates 14, 16 forming two opposing walls of the electrophoretic cell 12 and perimeter walls 17 which define a volume of space 18 within which the liquids forming the emulsion are positioned. Positioned on the first and second plates 14, 16 are first and second electrodes 20, 22 respectively which are connected to a power supply to form an electric field within the space 18.

The electrodes 20, 22 are preferably positioned on the inner surface of the first and second plates 14, 16 such that the electrodes are in contact with the emulsion. However, since the emulsion responds to an electric field, it is not necessary for the emulsion to be in contact with the electrodes and hence may be physically separated from the electrodes. In instances where the polar or non-polar phases contain compounds susceptible to oxidation or reduction reactions, it is preferred to insulate the electrodes from the emulsion in order to prevent electrochemical reactions in the polar or non-polar phases from occurring.

The electrodes can be made from a variety of materials commonly used in the electrophoretic display industry. For example, Si, ITO (Indium Tin Oxide), Al, Ag, and Cr are preferably used for undivided electrodes. Metals are preferably used for divided electrodes.

The plates 14, 16 are preferably made of a light transmissive material such as glass or plastic. When the display is operated in a reflective mode, the second plate is preferably made from a nontransparent plastic or ceramic.

The spacing between the first and second plates 14, 16 is preferably between about 1 and 100 microns, more preferably about 10–30 microns. Overall, including the first and second plates 14, 16, the display may be between about 0.1 and 10 mm in thickness.

Figure 3A:
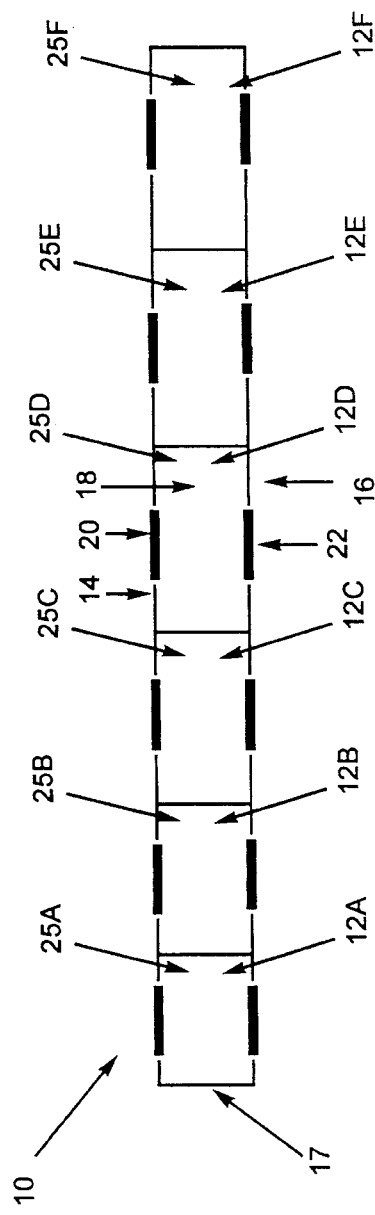
FIGS. 3A–B illustrate a segmented display formed of a series of cells.
Figure 3B:
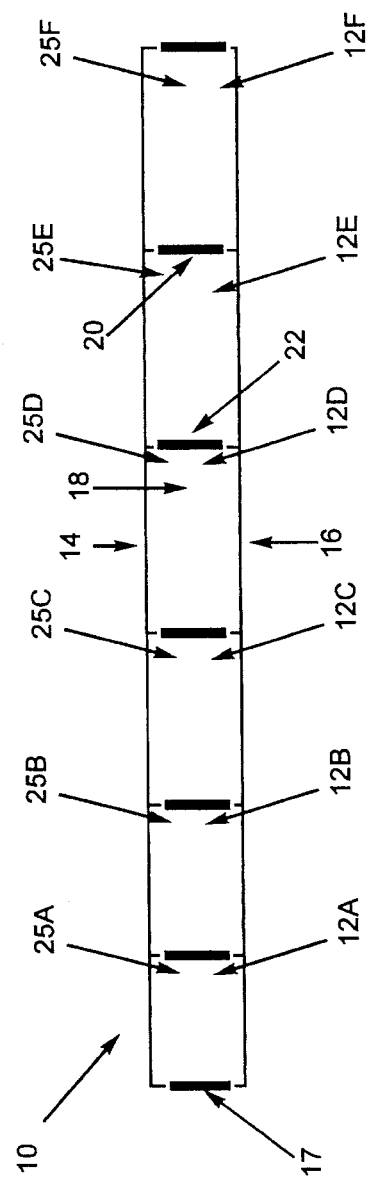

FIGS. 3A–B illustrate segmented displays formed of a series of cells 12A–F, each cell corresponding to individual pixels 25A–F. Adjacent each cell is a pair of electrodes 20, 22, which define each pixel. FIG. 3A illustrates the electrodes 20, 22 being positioned adjacent opposing plates 14, 16 of the display. FIG. 3B illustrates the electrodes 20, 22 being positioned adjacent opposing perimeter walls 17.

Alternatively, as illustrated in FIG. 4, the display 10 may be a non-segmented display where each cell 12 functions as an array of pixels 25. As illustrated in FIG. 4, one of the plates, illustrated in the figure as the first plate 14, includes a segmented electrode 21 formed of a plurality of segments 23, the power supply to each segment 23 being separately controlled. By separately controlling the power supply to each segment 23 of the electrode, different electric fields can be formed between each segment 23 of the segmented electrode 21 and the electrode positioned on the opposing plate. As a result, each segment 23 of the segmented electrode 21 can function as a separate pixel of the display 10.

With regard to the sizes of the display, there is practically no limit to the size of the display or electrode that may be used. For example, pixels may be formed having a diameter between 10 microns and about 1 meter.

For non-segmented displays, the polar liquid migrates toward those pixels which are most frequently switched. In order to more rapidly disperse the polar phase, a fast antimigration waveform may be applied.

Figure 5:
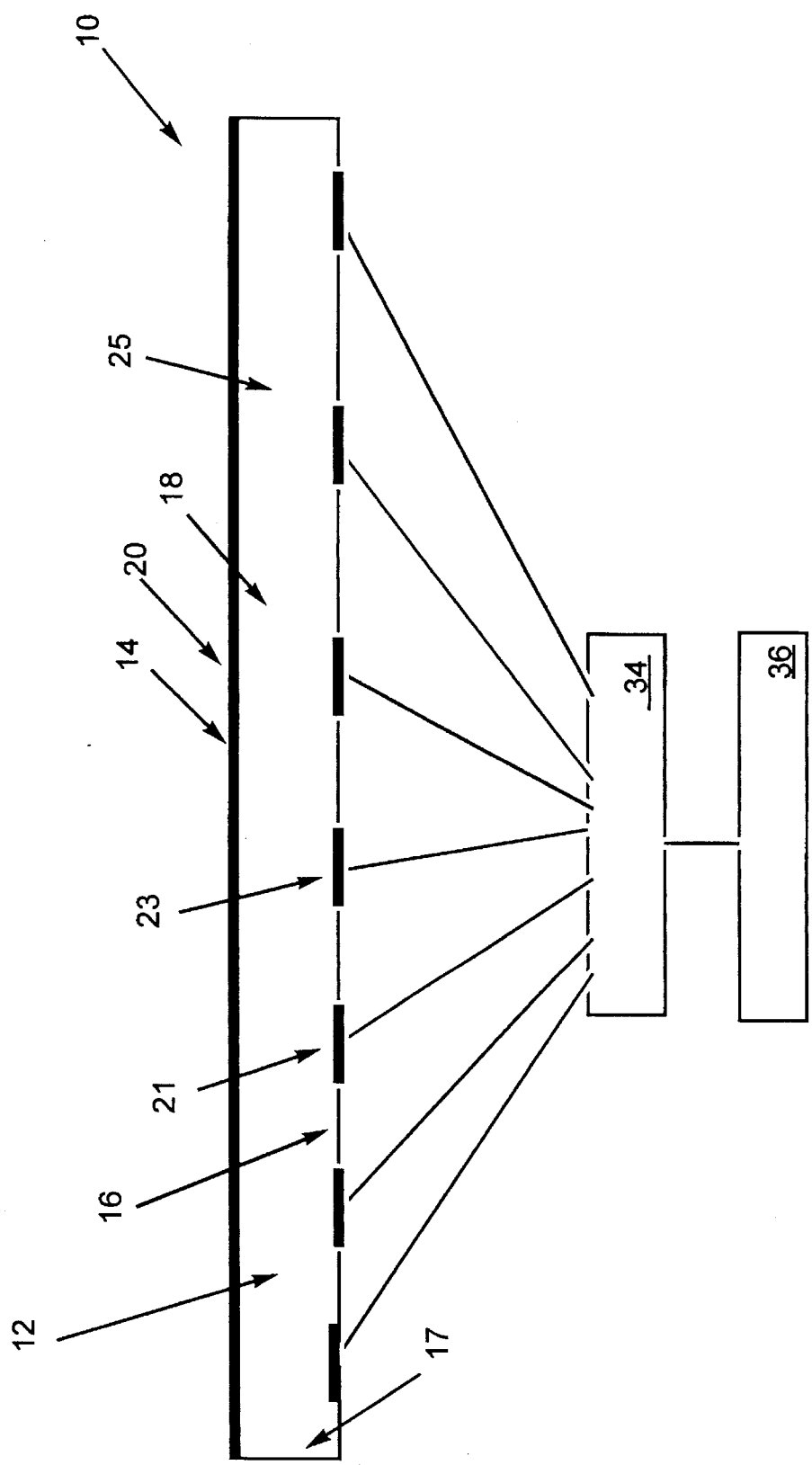
FIG. 5 illustrates a display connected to a multiplexer and a controller.

As illustrated in FIG. 5, each of the electrodes or electrode segments defining the pixels 25 of the display 10 are connected to a multiplexer 34 which controls the power supply to the one or more electrode pairs forming the pixels 25 of the display. The multiplexer 34 is connected to a data controller 36 which receives data corresponding to the image to be formed by the display 10 and conveys that data to the multiplexer 34 in the form of control signals which control the multiplexer 34 and hence the electric fields produced by the electrodes.

Figure 6:
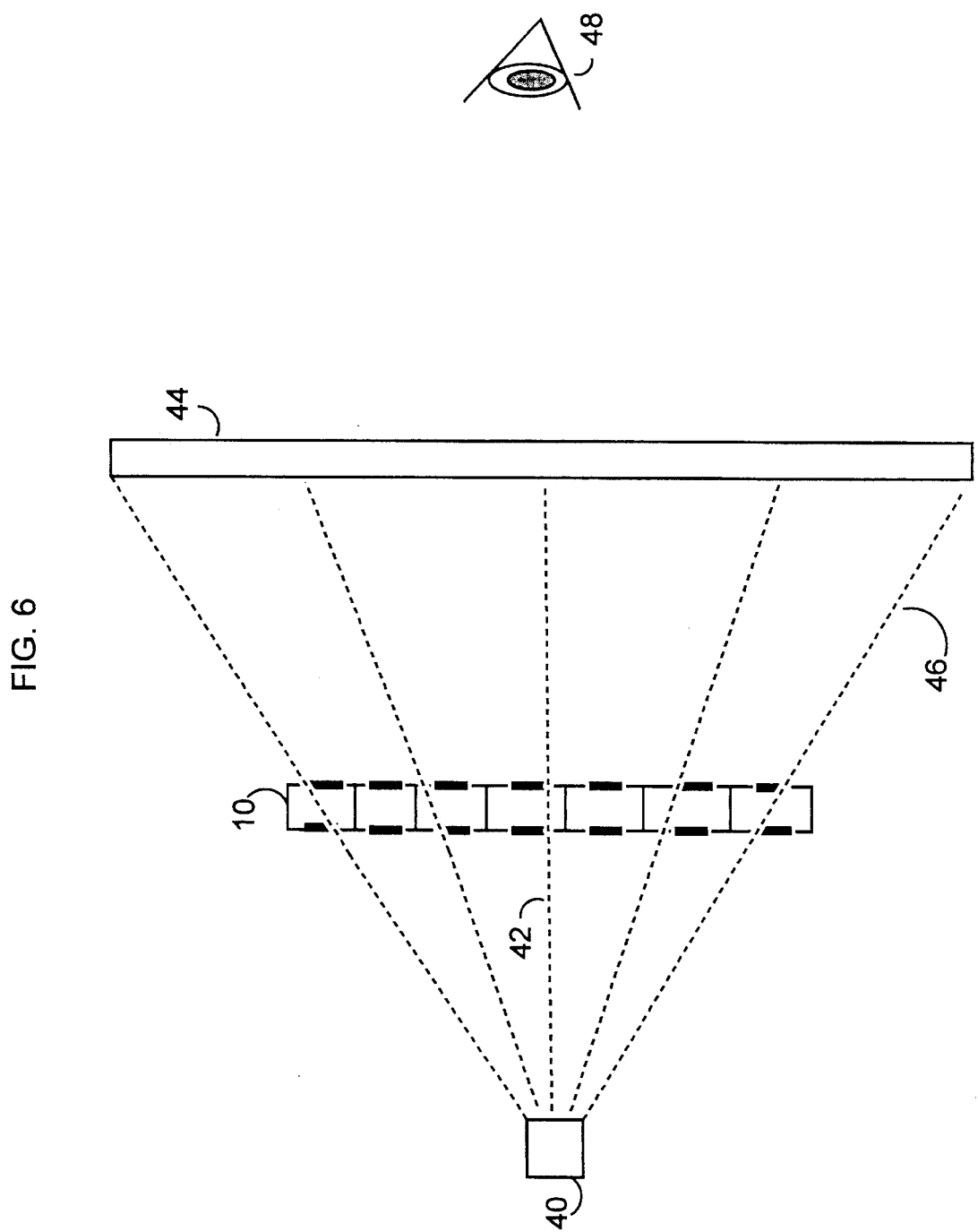
FIG. 6 illustrates a light transmissive display operated in a projection mode.

The electrophoretic display may be a light transmissive display, for example, operated in a projection mode as illustrated in FIG. 6. As illustrated in FIG. 6, the display 10 is illuminated by a light source 40 such that light 42 is projected through the display 10 and onto a screen 44. The screen 44 may be a reflective screen or a light diffusive screen as illustrated in FIG. 6. Light 42 may be projected through the display 10 onto the screen 44, for example with the aid of an optic 46, such that the image projected on the screen 44 is magnified relative to the size of the display 10 as seen by observer 48.

Figure 7:
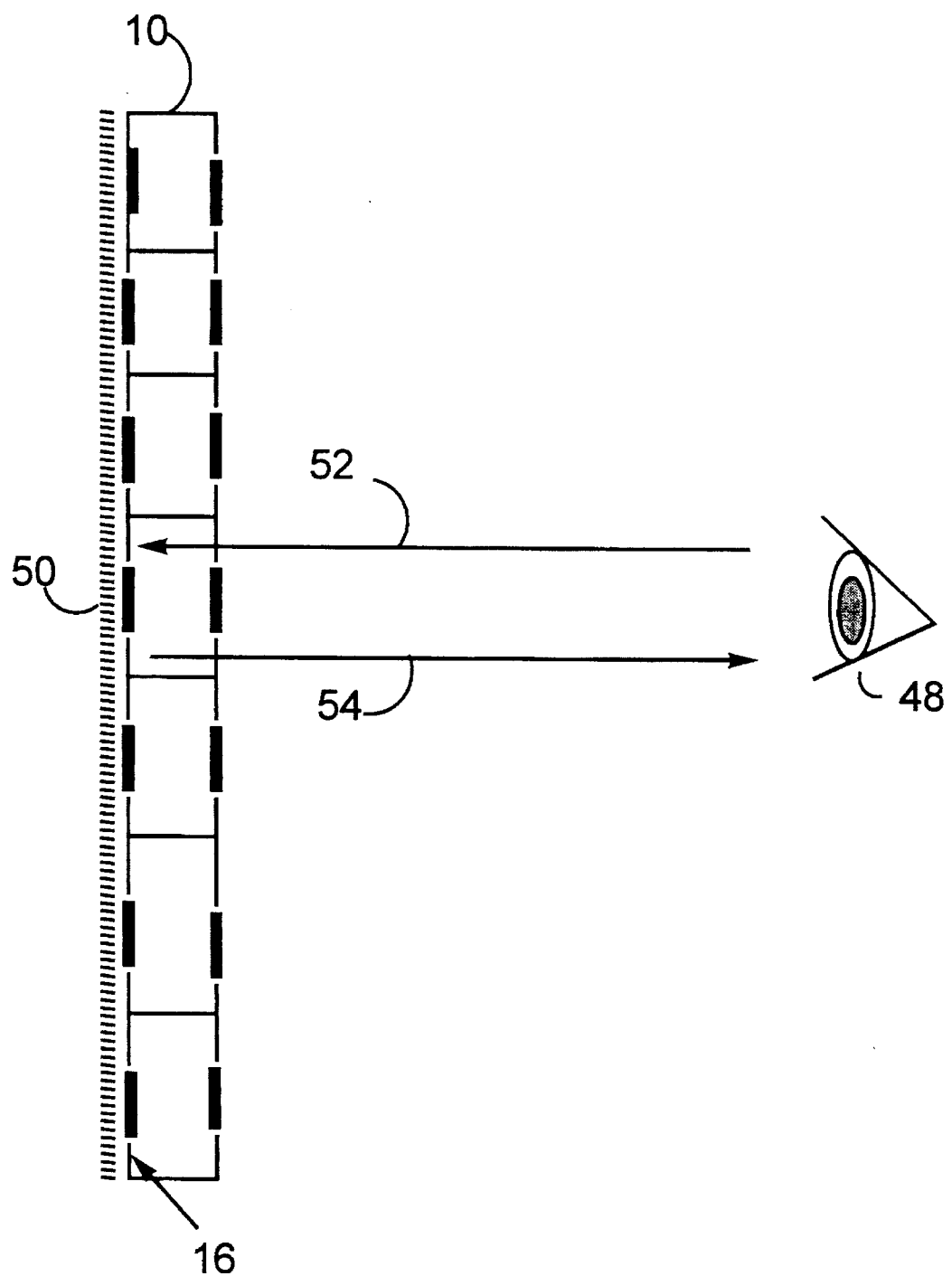
FIG. 7 illustrates a reflective display.

Alternatively, as illustrated in FIG. 7, the electrophoretic display may be a reflective display. As illustrated in FIG. 7, the reflective electrophoretic display includes a reflective element 50 adjacent the second plate 16. In this embodiment, light passes through the emulsion along path 52, is reflected off the reflective element 50 and passes back through the emulsion along path 54 to an observer 48.

A variety of electrode designs may be used with the display of the present invention to form an electric field through the emulsion in the display, all of which are intended to fall within the scope of the present invention.

It is preferred that at least one of the electrodes of the pair of the electrodes forming a pixel be a divided electrode. A divided electrode refers to an electrode formed of series of conductive regions with one or more non-conductive regions interposed between the conductive regions. The conductive regions forming the divided electrode may have a variety of shapes including, for example, lines, boxes and circles. By contrast, an undivided electrode refers to an electrode formed of a single conductive region no non-conductive regions interposed within the conductive region.

Figure 8:
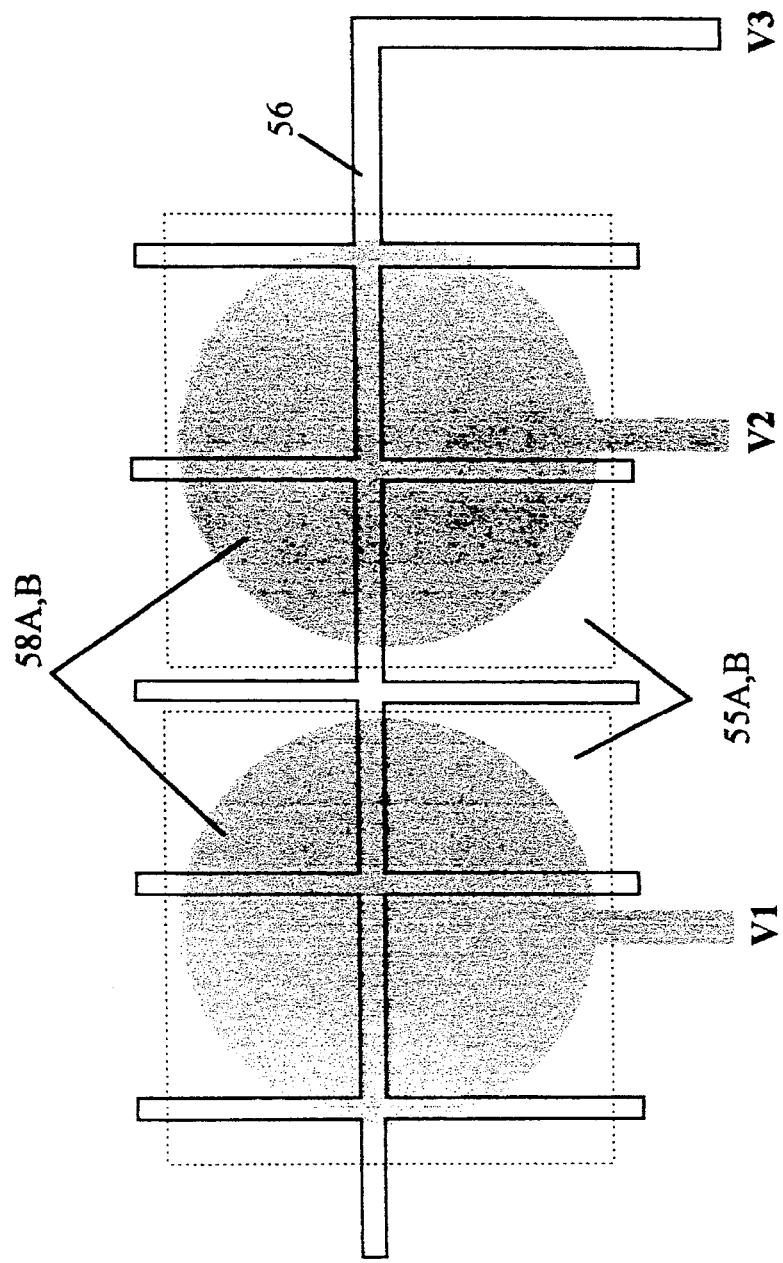
FIG. 8 illustrates an electrode design for use in the display including a divided electrode.

A divided electrode and an undivided electrode are illustrated in FIG. 8. As illustrated in FIG. 8, the display 10 includes two pixels 55A, B each pixel being formed by a divided electrode 56 and one of the undivided electrodes 58A, B. As illustrated, divided electrode 56 is formed of a series of conductive strips which are connected together and have the same electric potential. By contrast, elements 58A–B illustrate undivided electrodes as spherically shaped electrodes. Each undivided electrode (58A,B) is attached to a separate voltage source (V1 ,V2) while the divided electrode 56 is attached to a single voltage source V3.

FIG. 9 illustrates a system of electrodes that may be used in the present invention which includes a pair of divided electrodes 62A,B, a divided control electrode 64, and three undivided opposing electrodes 66A,B,C. Six pixels 68A–F, formed by this series of electrodes are illustrated.

The control electrode 64 serves to adjust the electric field between the main electrodes to establish a threshold for transporting the polar phase within the non-polar phase. As discussed herein, the control electrode can be used to introduce a hold state on selected pixels while other pixels are addressed.

The control electrode is typically positioned between the main electrodes as a grid electrode deposited on an insulator layer. The grid electrodes may also form strips perpendicular to the cathode strips allowing for X–Y addressing.

In a preferred embodiment, illustrated in FIG. 9, the control electrode is positioned in the same plane as the two divided main electrodes. This electrode design has the advantage of simplifying the manufacture of the display.

Formation of an image using an electrophoretic display of the present invention is accomplished by controlling the appearance of the one or more pixels in the display. In general, each pixel of the display is capable of being in an "on state", referred to herein as when the polar phase and dye are partitioned relative to the non-polar phase such that the pixel has the appearance of the non-polar phase and an "off state", referred to herein as when the polar phase and dye are distributed within the non-polar phase such that the pixel has the combined appearance of the polar and non-polar phases. For example, when the non-polar phase is yellow and the polar phase is blue, the pixel is yellow in the "on state" and green (blue plus yellow) in the "off state."

Controlling the transition of the pixels between "on" and "off" states is referred to as addressing the pixels. FIGS. 10A–F illustrate a series of electronic parameters that may be used to address pixels in an electrophoretic display illustrated in FIG. 8.

Figure 10A:
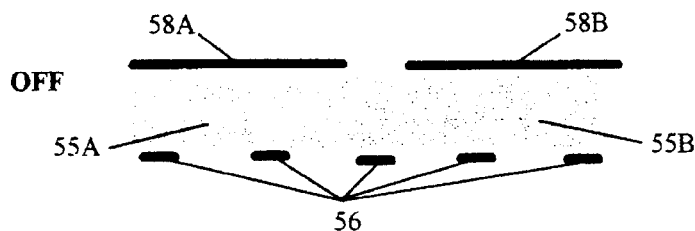
FIGS. 10A–E illustrate a series of electronic parameters that may be used to address pixels in the electrophoretic display illustrated in FIG. 8.

FIG. 10A illustrates two pixels 55A, B in an off state when no voltage is applied to divided electrode 56, and undivided electrodes 58A, B. An emulsion forms spontaneously within the display when no electric field is applied. As a result, pixels transition to an off state when the electric field is removed, thus causing the display to automatically erase itself. The transition to the off state when no electric field is applied is relatively slow, generally taking between about 0.1 seconds and 10 seconds. In order to more rapidly transition between images, an electric field may be formed which serves to erase the display by driving the pixel to an off state. Erasing conditions are described with regard to FIGS. 10D–E.

Figure 10B:
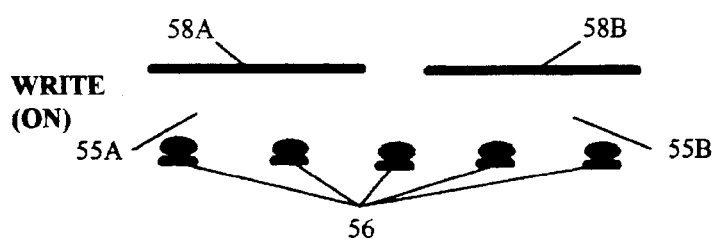
Figure 10C:
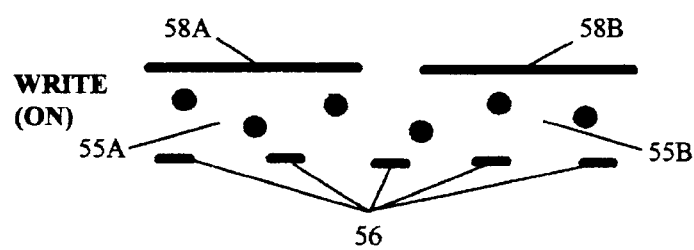

FIGS. 10B–C illustrate write conditions, i.e., an electric field which causes pixels to move to an on state. In one embodiment, illustrated in FIG. 10B, a constant electric field is applied which causes the polar phase to accumulate adjacent the divided electrodes 56, thereby causing pixels 55A, B to take on the appearance of the non-polar phase. In an alternate embodiment, illustrated in FIG. 10C, an alternating electric field, generally about 1–100 Hz, can be used as the writing condition to cause the polar liquid to coagulate. Under both writing conditions, the pixel macroscopically takes on the appearance of the non-polar phase.

Figure 10D:
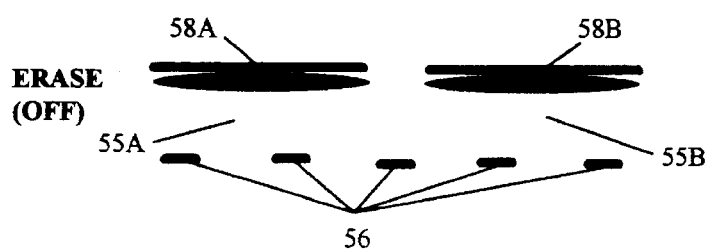
Figure 10E:
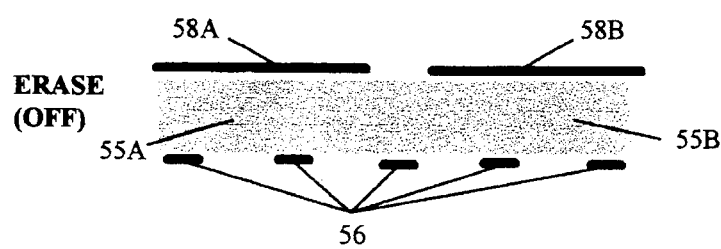

FIGS. 10D–E illustrate pixels under erase conditions, i.e., when an electric field is applied which causes the pixels to transition to an off state. Erasing may be accomplished by applying a constant electric field. As illustrated in FIG. 10D, this form of erase conditions is accomplished by attracting the polar phase to the undivided electrodes 58A, B. Alternatively, erasing conditions can be used to accelerate the redispersion of the polar phase into a non-polar phase of the emulsion. For example, as illustrated in FIG. 10E, an alternating electric field may be applied having a frequency between about 100 Hz and 100 kHz which causes the polar phase to rapidly be redispersed in the non-polar phase.

For high resolution displays, it is preferred not to address each pixel individually. Rather, it is preferred to employ an X-Y addressing method where columns and rows of electrodes are addressed at the same time. According to the X-Y addressing method, pixels are addressed by applying proper voltages to the column and the row whose intersection defines the pixel. The X-Y addressing method is most commonly performed by scanning rows, i.e., applying a proper voltage to one row electrode after another at a constant rate, while applying proper voltages to the column electrodes to write selected pixels in the row.

During the process of X-Y addressing, pixels that were previously placed in either an on or an off state fade to an off state. As a result, continuous refreshing is required. In addition, the fading of pixels limits the contrast that is achieved. In order to overcome these limitations, special techniques, such as Active Matrix Addressing have been employed. Active Matrix Addressing refers to the use of a non-linear electronic element, such as a thin-film transistor (TFT) or a pair of Schottky barrier diodes patterned directly on the surface of the plates, the non-linear element serving to receive the control signal from the drivers and apply a constant voltage directly to selected pixels, the voltage being held constant at the pixel until addressed otherwise. Control electrodes may also be added to the display to provide the addressed pixels with memory.

When addressing a display, rows of electrodes can be addressed sequentially or in a random order, depending on the application.

The following examples describe the formation of an emulsion to be used in an electrophoretic display of the present invention. The following examples also set forth suitable electric field parameters for operating the electrophoretic display. It is noted that recitation of these examples are for purposes of illustration and are not intended to be limiting. Further objectives and advantages of the present invention other than those set forth above will become apparent from the examples which are not intended to limit the scope of the present invention.

EXAMPLES

1a. Preparation Of A High Frequency Responsive Emulsion

8-Amino-7-(3-nitrophenylazo)-2-(phenylazo)-1-naphthol-3,6-disulfonic Acid Disodium Salt (33 mg) is loaded into a glass vial with dimethylformamide (DMF) (300 µl) as the polar solvent. Bis(2-ethylhexyl)sodium sulfosuccinate (50 mg) is then added as the detergent. 5 ml of xylene is then added to the vial as the non-polar phase. The vial is capped and sonicated for 3 hours at 50° C. After cooling to room temperature, the resulting emulsion is diluted with 5 ml of xylene and is transferred to an electrophoretic cell for use. It is noted that alternate mechanisms for forming the emulsion may be employed, including for example, applying an alternating electric field, shaking and heating.

The coagulation of the emulsion depends on the emulsion's composition, strength and the frequency of the applied electric field. In a ±20,000 V/cm alternating electric field, the emulsion described in this example weakly coagulates at 200 Hz, spreads at 2 kHz and coagulates strongly at 20 kHz.

1b. Preparation Of A Low Frequency Responsive Emulsion

8-Amino-7-(3-nitrophenylazo)-2-(phenylazo)-1-naphthol-3,6-disulfonic Acid Disodium Salt (78 mg) is loaded into a glass vial with dimethylformamide (DMF) (58 µl) as the polar solvent. Bis(2-ethylhexyl)sodium sulfosuccinate (70 mg) and Cetyltrimethylammonium bromide (CTAB) (30 mg) are then added as the detergent. 2 ml of xylene is then added to the vial as the non-polar phase. The vial is capped and sonicated for 3 hours at 50° C. After cooling the mixture to room temperature, any insoluble salts (e.g. NaBr) that are precipitated during sonication are allowed to settle. The resulting blue emulsion is then separated from the precipitate and transferred to an electrophoretic cell for use.

In a ±10,000 V/cm alternating electric field, the emulsion described in this example coagulates at frequencies below about 50 Hz and spreads at frequencies above about 100 Hz. The difference in the coagulation and spreading pattern of this emulsion, as compared to the emulsion described in Example 1a, is believed to be due to the addition of the second detergent (CTAB).

2. Addressing Of Electrophoretic Display

A. Direct Addressing Display With Divided Electrodes

FIG. 8 illustrates a display having divided electrodes and a positively charged non-continuous phase. The divided electrode 56 is grounded (0 V). In order to write a pixel, a voltage of +10 V is applied to the undivided electrode 58 A or B. In order to erase the pixel, a voltage of −10 V is applied to the undivided electrode 58 A or B. The applied voltages can be held indefinitely since no current flows through the display after a short transient current associated with the initial movement of the polar liquid to the negative electrode.

B. Direct Addressing Display With Undivided Electrodes

The following is a direct addressing protocol for a display with a pair of undivided electrodes and a low frequency responsive emulsion having a positively charged non-continuous phase. A first undivided electrode is grounded (0 V). In order to write a pixel, an alternating voltage of ±10 V is applied to the second, opposite undivided electrode at a frequency of 50 Hz. In order to erase the pixel, the second opposite undivided electrode can be grounded or disconnected. For a faster erase rate, an alternating voltage of ±10 V having a frequency of 1000 Hz is applied to the second opposite undivided electrode. Alternatively, an asymmetric alternating voltage of any frequency can be applied. When an asymmetric alternating voltage is applied, the polar liquid spreads over whichever electrode has an average net negative voltage.

Simultaneous rapid erasing of all pixels can be accomplished using an antimigration waveform. Antimigration waveforms are sequences of voltages applied to electrodes designed to distribute the polar liquid phase inside the display. The sequences are fast and transparent to the observer. A typical sequence will write and erase patterns of alternating 1×1, 2×2, 3×3 checkerboards of pixels each 1 millisecond in duration after writing one page. Another method is to move the polar phase in the X and Y direction on the surfaces of the electrodes by moving patterns of voltages. For example, voltages on the electrode may be modulated as outlined in Table 1.

TABLE 1

| Electrode | Low Voltage | High Voltage | Duration |
|---|---|---|---|
| X or Y | 1, 2, 3, 7, 8, 9 | 4, 5, 6, 10, 11, 12 | 1 msec |
| Coord. | 2, 3, 4, 8, 9, 10 | 1, 5, 6, 7, 11, 12, 13 | 1 msec |
| | 3, 4, 5, 9, 10, 11 | 1, 2, 6, 7, 8, 12, 13, 14 | 1 msec |

C. X–Y Addressing Of An Electrophoretic Display

The X–Y addressing of an electrophoretic display depends on many parameters like the relative distances between electrodes, threshold voltages needed to overcome surface tension forces and transient time of the emulsion's motion. As a result, there is a wide range of voltage parameters that may be used to operate a display. Typically, voltages are optimized for each display configuration and emulsion in order to achieve the best contrast and speed. The following examples illustrate one approach to addressing a display where the voltages applied to the electrodes have only two levels and the control electrode is connected together for all pixels. It should be understood that more complex display designs are possible and are intended to fall within the scope of the present invention. It should also be noted that more complex addressing protocols are also possible which may be optimized for the particular display being used.

1. X–Y Addressing Of Display With Divided Electrodes

An electrode configuration including a pair of divided electrodes 62 A, B, a divided control electrode 64 and three undivided opposing electrodes 66 A, B, C which define six pixels 68 A-F is illustrated in FIG. 9. FIGS. 11A–D provide a side view of the display illustrated in FIG. 9 in order to show different addressing states for the display. Only pixels 68A and 68B are shown in FIGS. 11A–D. For simplicity, only two strips per pixel are shown.

Figure 11A:
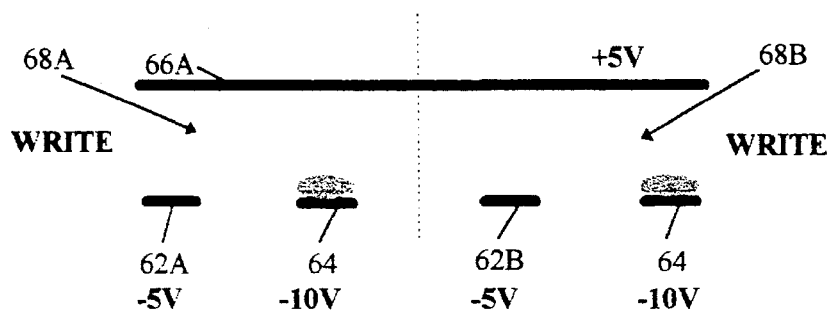
FIGS. 11A–D show different addressing states for the display illustrated in FIG. 9.

As illustrated in FIG. 11A, all pixels are initially written by applying +5 V to 66A, −10 V to the control electrode 64 and −5 V to divided electrodes 62A and 62B. This addressing of the electrodes places the pixels in an on state where the pixels become transparent.

Figure 11B:
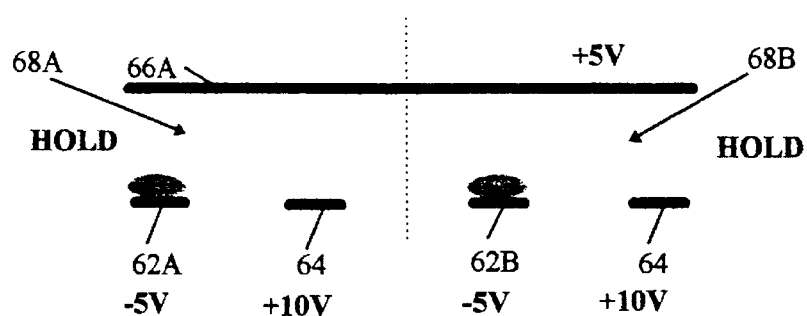

As illustrated in FIG. 11B, when the voltage on the control electrode 64 is changed to +10 V, the display is placed in a hold state where the display remains transparent and the polar phase moves from the control electrode 64 to the divided electrodes 62A and 62B.

Figure 11C:
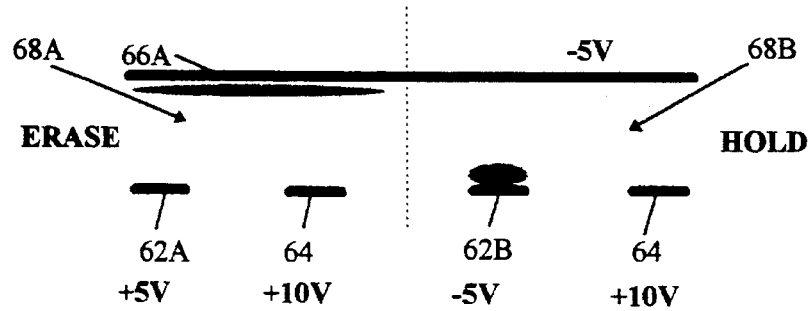

As illustrated in FIG. 11C when the voltage of the undivided electrode 66A is changed to −5 V and the voltage of the divided electrode 62A is changed to +5 V, pixel 68A is erased by being turned to an off state. The polar phase remains adjacent divided electrode 62B in pixel 68B due to the shielding effect of control electrode 64. As a result, pixel 68B remains in a hold state.

Figure 11D:
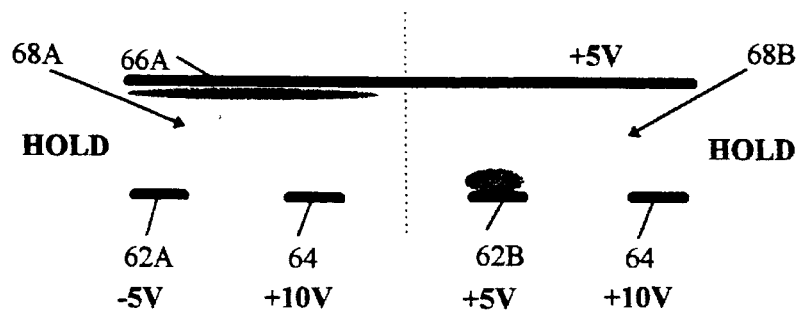

In order to address the next row of electrodes (62), the voltage of the divided electrode 62A is changed to −5 V and the voltage of divided electrode 62B is changed to +5 V. In order to erase a selected pixel, the voltage of the undivided electrode 66A is set to −5 V. In order to hold a selected pixel, the voltage of the undivided electrode 66A is set to +5 V. As illustrated in FIG. 11D, pixel (68A) which was erased in FIG. 11C is not written by these changes in voltages due to shielding by the control electrode 64. Pixel 68B is not erased due to the shielding by the control electrode 64.

The foregoing description of preferred embodiments of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. An electrophoretic display cell comprising:
   first and second electrodes spaced apart to define a volume of space therebetween; and
   an emulsion positioned within the space, the emulsion including
   a non-polar phase forming a continuous phase of the emulsion, and
   a polar phase forming droplets dispersed in the non-polar phase of the emulsion, the polar phase including a dye which is substantially insoluble in the non-polar phase;
   the distribution of the polar phase droplets dispersed in the non-polar phase being controllable by an electric field formed between the first and second electrodes.

2. The electrophoretic display according to claim 1 wherein the non-polar phase is a liquid and includes a compound selected from the group consisting of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{3-30}$ esters, $C_{3-30}$ thioesters, $C_{3-30}$ thioethers, terpenes, $C_{2-30}$ organosilanes, $C_{2-30}$ organosiloxanes, and aromatic compounds, each of which may be cyclic or acyclic and may be optionally substituted with halides or other non-polar substituents.

3. The electrophoretic display according to claim 2 wherein the non-polar phase includes an aromatic compound selected from the group consisting of benzenes, toluenes and xylenes.

4. The electrophoretic display according to claim 2 wherein the non-polar phase has a colored appearance.

5. The electrophoretic display according to claim 1 wherein the polar phase further includes a polar solvent selected from the group consisting of alcohols, amines, amides, ketones, carboxylic acids and their salts, glycols, polyethers, sulfides, sulfonic acids, sulfenic acids and their salts, sulfates, phosphides, phosphites, phosphonites, phosphinites, phosphates, phosphonates, phosphinates, imides, nitriles, isonitriles, amidines, nitro and nitroso compounds, sulfoxides, sulfonates, thiols, and water.

6. The electrophoretic display according to claim 5 wherein the polar solvent is selected from the group consisting of DMSO, DMF, higher amides, methanol, ethanol, glycols, nitromethane, acetonitrile, water, methoxyethanol, methyl Cellosolve and monoethyl ethers.

7. The electrophoretic display according to claim 1 wherein the polar phase has a net charge.

8. The electrophoretic display according to claim 1 wherein the dye is selected from the group consisting of monazo dyes, diazo dyes, triphenylmethane dyes, pyrazolone dyes, acridines, porphyrines, diformazan dyes, squarain dyes, oxazines, formazan dyes, colored metal and transition metal complexes, metal salts, acid anthraquinone dyes, amphoteric anthraquinone dyes, diphenylmethane dyes, polymethine dyes, thiazines, phthalocyanines and tetrazolium dyes.

9. The electrophoretic display according to claim 1 wherein the ratio of non-polar phase to the polar phase is between about 1:1 to 1:100 volume to volume.

10. The electrophoretic display according to claim 1 wherein the polar phase further includes a detergent.

11. The electrophoretic display according to claim 10 wherein the detergent is selected from the group consisting of phospholipids, lecithins, polyoxyethylenes, alkyldimethylamine oxides, quarternary ammoniums, alkyl and aryl sulfonates, alkyl and aryl sulfates, carboxylated detergents, phosphate based detergents, fluorocarbon based detergents, $SiO_2$, $Al_2O_3$, $BaTiO_4$, and zeolites.

12. The electrophoretic display according to claim 1 wherein the emulsion substantially fills the volume of space.

13. The electrophoretic display according to claim 1 wherein a volume of gas is also positioned within the volume of space.

14. The electrophoretic display according to claim 13 wherein the volume of gas within the space has a thickness between about 1 and 100 microns.

15. The electrophoretic display according to claim 1 wherein the display includes a series of first and second electrodes, the series of first and second electrodes defining a series of pixels, the display further including a multiplexer attached to the series of first and second electrodes for selectively delivering voltages to different electrodes in the series.

16. The electrophoretic display according to claim 15, further including a controller, the controller being connected to the multiplexer to deliver control signals controlling the delivery of voltage to the different electrodes in the series of electrodes.

17. A non-segmented electrophoretic display comprising:
   a first and a plurality of second electrodes, the first electrode and plurality of second electrodes being spaced apart to define a volume of space therebetween;
   a plurality of control electrodes positioned adjacent the plurality of second electrodes; and
   an emulsion positioned within the space, the emulsion including
      a non-polar phase forming a continuous phase of the emulsion, and
      a polar phase forming droplets dispersed in the non-polar phase of the emulsion, the polar phase including a dye which is substantially insoluble in the non-polar phase;
   the distribution of the polar phase droplets dispersed in the non-polar phase being controllable by an electric field formed between the first and second electrodes.

18. The non-segmented electrophoretic display according to claim 17, wherein the display further includes a multiplexer attached to the first, second and control electrodes for delivering different voltages to each electrode.

19. The non-segmented electrophoretic display according to claim 18, further including a controller, the controller being connected to the multiplexer to deliver control signals controlling the delivery of voltage to the different electrodes.

20. A method for forming an image by electrophoretic phase separation of an emulsion comprising:
   forming an emulsion between a non-polar phase forming a continuous phase of the emulsion and a polar phase forming droplets dispersed in the non-polar phase of the emulsion, the polar phase including a dye which is substantially insoluble in the non-polar phase and which has a color appearance which is in contrast to a color appearance of the non-polar phase, the emulsion having the combined color appearance of the non-polar phase and the polar phase; and
   applying an electric field to the emulsion to cause the polar phase droplets dispersed in the non-polar phase to redistribute such that the emulsion adopts the color appearance of the non-polar phase.

21. The method according to claim 20 wherein
   the non-polar phase is a liquid and includes a compound selected from the group consisting of $C_{1-30}$ alkanes, $C_{2-30}$ alkenes, $C_{3-30}$ alkynes, $C_{3-30}$ aldehydes, $C_{3-30}$ ketones, $C_{2-30}$ ethers, $C_{3-30}$ esters, $C_{3-30}$ thioesters, $C_{3-30}$ thioethers, terpenes, $C_{2-30}$ organosilanes, $C_{2-30}$ organorganosiloxanes, and aromatic compounds, each of which may be cyclic or acyclic and may be optionally substituted with halides or other non-polar substituents.

22. The method according to claim 20 wherein the non-polar phase includes an aromatic compound selected from the group consisting of benzenes, toluenes and xylenes.

23. The method according to claim 20 wherein the non-polar phase has a colored appearance.

24. The method according to claim 20 wherein the polar phase further includes a polar solvent selected from the group consisting of alcohols, amines, amides, ketones, carboxylic acids and their salts, glycols, polyethers, sulfides, sulfonic acids, sulfenic acids and their salts, sulfates, phosphides, phosphites, phosphonites, phosphinites, phosphates, phosphonates, phosphinates, imides, nitriles, isonitriles, amidines, nitro and nitroso compounds, sulfoxides, sulfonates, thiols, and water.

25. The method according to claim 24 wherein the polar solvent is selected from the group consisting of DMSO, DMF, higher amides, methanol, ethanol, glycols, nitromethane, acetonitrile, water, methoxyethanol, methyl Cellosolve and monoethyl ethers.

26. The method according to claim 20 wherein the dye is selected from the group consisting of monazo dyes, diazo dyes, triphenylmethane dyes, pyrazolone dyes, acridines, porphyrines, diformazan dyes, squarain dyes, oxazines, formazan dyes, colored metal and transition metal complexes, metal salts, acid anthraquinone dyes, amphoteric anthraquinone dyes, diphenylmethane dyes, polymethine dyes, thiazines, phthalocyanines and tetrazolium dyes.

27. The method according to claim 20 wherein the polar phase further includes a detergent.

28. The method according to claim 27 wherein the detergent is selected from the group consisting of phospholipids, lecithins, polyoxyethylenes, alkyldimethylamine oxides, quarternary ammoniums, alkyl and aryl sulfonates, alkyl and aryl sulfates, carboxylated detergents, phosphate based detergents, fluorocarbon based detergents, $SiO_2$, $Al_2O_3$, $BaTiO_4$, and zeolites.

29. The method according to claim 20 wherein the polar phase has a net charge.

30. The method according to claim 29 wherein the electric field has a net polarity, the polar phase redistributing by moving in a direction opposite to the polarity of the electric field.

31. The method according to claim 20 wherein the electric field is an alternating electric field having a frequency between about 1 Hz and 100 Hz.

32. The method according to claim 20 further including the step of redispersing the polar phase in the non-polar phase by applying an alternating electric field having a frequency between about 100 Hz and 100 kHz.

* * * * *